United States Patent
Akl et al.

(10) Patent No.: US 11,659,413 B2
(45) Date of Patent: May 23, 2023

(54) BEAM OPTIMIZATION FOR SOFT PHYSICAL CELL IDENTIFIER CHANGE

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/362,759

(22) Filed: Jun. 29, 2021

(65) Prior Publication Data

US 2022/0007211 A1   Jan. 6, 2022

Related U.S. Application Data

(60) Provisional application No. 63/047,207, filed on Jul. 1, 2020.

(51) Int. Cl.
*H04W 24/02* (2009.01)
*H04W 56/00* (2009.01)

(52) U.S. Cl.
CPC ......... *H04W 24/02* (2013.01); *H04W 56/001* (2013.01)

(58) Field of Classification Search
CPC ... H04W 24/02; H04W 56/001; H04W 84/00; H04W 48/12; H04L 5/0048; H04B 7/024; H04B 7/0695
See application file for complete search history.

(56) References Cited

U.S. PATENT DOCUMENTS

| | | | |
|---|---|---|---|
| 2021/0160744 A1* | 5/2021 | Zetterberg | H04W 36/0058 |
| 2022/0046750 A1* | 2/2022 | Jeon | H04W 36/06 |
| 2022/0232391 A1* | 7/2022 | Yang | H04W 16/04 |

OTHER PUBLICATIONS

International Search Report and Written Opinion—PCT/US2021/039998—ISA/EPO—dated Jan. 3, 2022.

(Continued)

*Primary Examiner* — Kyaw Z Soe
(74) *Attorney, Agent, or Firm* — Qualcomm Incorporated

(57) ABSTRACT

Aspects of disclosure relate to a network node for changing a physical cell identifier (PCI). The network node transmits a first signal based on a first PCI during a first synchronization signal block (SSB) occasion, transmits a second signal based on the first PCI during a second SSB occasion, and transitions from the first PCI to a second PCI. During a transition period, the network node transmits the first signal based on the second PCI during the first SSB occasion, and continues to transmit the second signal based on the first PCI during the second SSB occasion. After an end of the transition period, the network node continues to transmit the first signal based on the second PCI during the first SSB occasion, and ceases transmission of the second signal based on the first PCI during the second SSB occasion. Other aspects and features are also claimed and described.

30 Claims, 14 Drawing Sheets

(56) References Cited

OTHER PUBLICATIONS

Alcatel-Lucent: "Service Continuity in Case of PCI/ECGI Change in Compensation Cell", 3GPP Draft, 3GPP TSG RAN WG3 Meeting #81bis, R3-131850 3rd Generation Partnership Project (3GPP), Mobile Competence Centre, 650, Route Des Lucioles, F-06921 Sophia-Antipolis Cedex, France, vol. RAN WG3, No. Venice, Italy, Oct. 7, 2013-Oct. 11, 2013 Sep. 27, 2013 (Sep. 27, 2013), XP050719948, pp. 1-3, Retrieved from the Internet: URL: http://www.3gpp.org/ftp/tsg_ran/WG3_lu/TSGR3_81bis/Docs/ [retrieved on Sep. 27, 2013] Section 2, Discussion.

Huawei, et al., "Add Use Case of PCI Configuration", 3GPP Draft, 3GPP TSG-SA5 Meeting #125, S5-193511 (Revision of S5-193134,S5-193113), PCR 28.861 Add Use Case of PCI Configuration, 3rd Generation Partnership Project (3GPP), Mobile Competence Centre, 650, Route Des Lucioles, F-06921 Sophia-Antipolis Cedex, Fra, vol. SA WG5, No. Newport Beach, US, Apr. 8, 2019-Apr. 12, 2019 Apr. 12, 2019 (Apr. 12, 2019), XP051704215, 2 Pages, Retrieved from the Internet: URL: http://www.3gpp.org/ftp/Meetings%5F3GPP%5FSYNC/SA5/Docs/S5%2D193511%2Ezip [retrieved on Apr. 12, 2019] Section 5.5.1.

Huawei: "Inter IAB Donor-CU Topology Adaptation", 3GPP Draft, 3GPP TSG-RAN WG3 Meeting #107-e, R3-200763 (Resubmission of R3-196995), 3rd Generation Partnership Project (3GPP), Mobile Competence Centre, 650, Route Des Lucioles, F-06921 Sophia-Antipolis Cedex, France, vol. RAN WG3. No. E-meeting, Feb. 24, 2020-Mar. 6, 2020 Feb. 14, 2020 (Feb. 14, 2020), XP051854207, pp. 1-4, Retrieved from the Internet: URL: https://ftp.3gpp.org/tsg_ran/WG3_lu/TSGR3_107_e/Docs/R3-200763.zip R3-200763 Inter IAB donor CU Topology Adaptation.doc [retrieved on Feb. 14, 2020] Section 2, Discussion.

Partial International Search Report—PCT/US2021/039998—ISA/EPO—dated Oct. 28, 2021.

* cited by examiner

BEAM OPTIMIZATION FOR SOFT PHYSICAL CELL IDENTIFIER CHANGE

CROSS-REFERENCE TO RELATED APPLICATIONS

This application claims priority to and the benefit of U.S. Provisional Application Ser. No. 63/047,207 entitled "BEAM OPTIMIZATION FOR SOFT PHYSICAL CELL IDENTIFIER CHANGE" filed on Jul. 1, 2020, the entire contents of said application are incorporated herein by reference as if fully set forth below in its entirety and for all applicable purposes.

INTRODUCTION

The technology discussed below relates generally to wireless communication systems, and more particularly, to a network node for changing a physical cell identifier (PCI).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communication system may include a number of base stations or network access nodes, each simultaneously supporting communication for multiple communication devices, which may be otherwise known as user equipment (UE).

Multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method performed at a network node for changing a physical cell identifier (PCI) is disclosed. The method includes transmitting a first signal based on a first physical cell identifier (PCI) during a first synchronization signal block (SSB) occasion, transmitting a second signal based on the first PCI during a second SSB occasion, wherein the first SSB occasion and the second SSB occasion are part of a set of SSB occasions in a periodically repeating time frame, transitioning from the first PCI to a second PCI, wherein during a transition period, the transitioning includes transmitting the first signal based on the second PCI during the first SSB occasion, and continuing to transmit the second signal based on the first PCI during the second SSB occasion, and wherein after an end of the transition period, the transitioning includes continuing to transmit the first signal based on the second PCI during the first SSB occasion, and ceasing transmission of the second signal based on the first PCI during the second SSB occasion, receiving configuration information from a controlling node, and selecting, based on the configuration information, the first SSB occasion to transmit the first signal based on the second PCI during the transition period.

In another example, a network node for changing a physical cell identifier (PCI) is disclosed. The network node includes at least one processor and a memory coupled to the at least one processor. The at least one processor and the memory are configured to transmit a first signal based on a first physical cell identifier (PCI) during a first synchronization signal block (SSB) occasion, transmit a second signal based on the first PCI during a second SSB occasion, wherein the first SSB occasion and the second SSB occasion are part of a set of SSB occasions in a periodically repeating time frame, transition from the first PCI to a second PCI, wherein during a transition period, the transitioning includes transmitting the first signal based on the second PCI during the first SSB occasion, and continuing to transmit the second signal based on the first PCI during the second SSB occasion, and wherein after an end of the transition period, the transitioning includes continuing to transmit the first signal based on the second PCI during the first SSB occasion, and ceasing transmission of the second signal based on the first PCI during the second SSB occasion, receive configuration information from a controlling node, and select, based on the configuration information, the first SSB occasion to transmit the first signal based on the second PCI during the transition period.

In a further example, a network node for changing a physical cell identifier (PCI) is disclosed. The network node includes means for transmitting a first signal based on a first physical cell identifier (PCI) during a first synchronization signal block (SSB) occasion, means for transmitting a second signal based on the first PCI during a second SSB occasion, wherein the first SSB occasion and the second SSB occasion are part of a set of SSB occasions in a periodically repeating time frame, means for transitioning from the first PCI to a second PCI, wherein during a transition period, the means for transitioning is configured to transmit the first signal based on the second PCI during the first SSB occasion, and continue to transmit the second signal based on the first PCI during the second SSB occasion, and wherein after an end of the transition period, the means for transitioning is configured to continue to transmit the first signal based on the second PCI during the first SSB occasion, and cease transmission of the second signal based on the first PCI during the second SSB occasion, means for receiving configuration information from a controlling node, and means for selecting, based on the configuration information, the first SSB occasion to transmit the first signal based on the second PCI during the transition period.

In yet another example, a non-transitory computer-readable medium storing computer-executable code at a network node for changing a physical cell identifier (PCI) is disclosed. The non-transitory computer-readable medium includes code for causing a computer to transmit a first signal based on a first physical cell identifier (PCI) during a first synchronization signal block (SSB) occasion, transmit a second signal based on the first PCI during a second SSB occasion, wherein the first SSB occasion and the second SSB occasion are part of a set of SSB occasions in a periodically repeating time frame, transition from the first PCI to a second PCI, wherein during a transition period, the transitioning includes transmitting the first signal based on the second PCI during the first SSB occasion, and continuing to transmit the second signal based on the first PCI during the second SSB occasion, and wherein after an end of the transition period, the transitioning includes continuing to transmit the first signal based on the second PCI during the first SSB occasion, and ceasing transmission of the second signal based on the first PCI during the second SSB occasion, receive configuration information from a controlling node, and select, based on the configuration information, the first SSB occasion to transmit the first signal based on the second PCI during the transition period.

In one example, a method performed at a network node for changing a physical cell identifier (PCI) is disclosed. The method includes transmitting a first signal based on a first physical cell identifier (PCI) during a first synchronization signal block (SSB) occasion, transmitting a second signal based on the first PCI during a second SSB occasion, transmitting a third signal based on the first PCI during a third SSB occasion, wherein the first, second, and third SSB occasions are part of a set of SSB occasions in a periodically repeating time frame, transitioning from the first PCI to a second PCI, wherein during a first transition period, the transitioning includes transmitting the first signal based on the second PCI during the first SSB occasion, continuing to transmit the second signal based on the first PCI during the second SSB occasion, and continuing to transmit the third signal based on the first PCI during the third SSB occasion, wherein during a second transition period, the transitioning includes continuing to transmit the first signal based on the second PCI during the first SSB occasion, transmitting the second signal based on the second PCI during the second SSB occasion, and continuing to transmit the third signal based on the first PCI during the third SSB occasion, and wherein after an end of the second transition period, the transitioning includes continuing to transmit the first signal based on the second PCI during the first SSB occasion, continuing to transmit the second signal based on the second PCI during the second SSB occasion, and ceasing transmission of the third signal based on the first PCI during the third SSB occasion, and selecting the first SSB occasion to transmit the first signal based on the second PCI during the first transition period and the second SSB occasion to transmit the second signal based on the second PCI during the second transition period.

In another example, a network node for changing a physical cell identifier (PCI) is disclosed. The network node includes at least one processor and a memory coupled to the at least one processor. The at least one processor and the memory are configured to transmit a first signal based on a first physical cell identifier (PCI) during a first synchronization signal block (SSB) occasion, transmit a second signal based on the first PCI during a second SSB occasion, transmit a third signal based on the first PCI during a third SSB occasion, wherein the first, second, and third SSB occasions are part of a set of SSB occasions in a periodically repeating time frame, transition from the first PCI to a second PCI, wherein during a first transition period, the transitioning includes transmitting the first signal based on the second PCI during the first SSB occasion, continuing to transmit the second signal based on the first PCI during the second SSB occasion, and continuing to transmit the third signal based on the first PCI during the third SSB occasion, wherein during a second transition period, the transitioning includes continuing to transmit the first signal based on the second PCI during the first SSB occasion, transmitting the second signal based on the second PCI during the second SSB occasion, and continuing to transmit the third signal based on the first PCI during the third SSB occasion, and wherein after an end of the second transition period, the transitioning includes continuing to transmit the first signal based on the second PCI during the first SSB occasion, continuing to transmit the second signal based on the second PCI during the second SSB occasion, and ceasing transmission of the third signal based on the first PCI during the third SSB occasion, and select the first SSB occasion to transmit the first signal based on the second PCI during the first transition period and the second SSB occasion to transmit the second signal based on the second PCI during the second transition period.

In a further example, a network node for changing a physical cell identifier (PCI) is disclosed. The network node includes means for means for transmitting a first signal based on a first physical cell identifier (PCI) during a first synchronization signal block (SSB) occasion, means for transmitting a second signal based on the first PCI during a second SSB occasion, means for transmitting a third signal based on the first PCI during a third SSB occasion, wherein the first, second, and third SSB occasions are part of a set of SSB occasions in a periodically repeating time frame, means for transitioning from the first PCI to a second PCI, wherein during a first transition period, the means for transitioning is configured to transmit the first signal based on the second PCI during the first SSB occasion, continue to transmit the second signal based on the first PCI during the second SSB occasion, and continue to transmit the third signal based on the first PCI during the third SSB occasion, wherein during a second transition period, the means for transitioning is configured to continue to transmit the first signal based on the second PCI during the first SSB occasion, transmit the second signal based on the second PCI during the second SSB occasion, and continue to transmit the third signal based on the first PCI during the third SSB occasion, and wherein after an end of the second transition period, the means for transitioning is configured to continue to transmit the first signal based on the second PCI during the first SSB occasion, continue to transmit the second signal based on the second PCI during the second SSB occasion, and cease transmission of the third signal based on the first PCI during the third SSB occasion, and means for selecting the first SSB occasion to transmit the first signal based on the second PCI during the first transition period and the second SSB occasion to transmit the second signal based on the second PCI during the second transition period.

In yet another example, a non-transitory computer-readable medium storing computer-executable code at a network node for changing a physical cell identifier (PCI) is disclosed. The non-transitory computer-readable medium includes code for causing a computer to transmit a first signal based on a first physical cell identifier (PCI) during a first synchronization signal block (SSB) occasion, transmit a second signal based on the first PCI during a second SSB occasion, transmit a third signal based on the first PCI during a third SSB occasion, wherein the first, second, and third SSB occasions are part of a set of SSB occasions in a periodically repeating time frame, transition from the first PCI to a second PCI, wherein during a first transition period, the transitioning includes transmitting the first signal based on the second PCI during the first SSB occasion, continuing to transmit the second signal based on the first PCI during the second SSB occasion, and continuing to transmit the third signal based on the first PCI during the third SSB occasion, wherein during a second transition period, the transitioning includes continuing to transmit the first signal based on the second PCI during the first SSB occasion, transmitting the second signal based on the second PCI during the second SSB occasion, and continuing to transmit the third signal based on the first PCI during the third SSB occasion, and wherein after an end of the second transition period, the transitioning includes continuing to transmit the first signal based on the second PCI during the first SSB occasion, continuing to transmit the second signal based on the second PCI during the second SSB occasion, and ceasing transmission of the third signal based on the first PCI during the third SSB occasion, and select the first SSB occasion to transmit the first signal based on the second PCI during the first transition period and the second SSB occasion to transmit the second signal based on the second PCI during the second transition period.

These and other aspects will become more fully understood upon a review of the detailed description, which follows. Other aspects and features will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In a similar fashion, while exemplary aspects may be discussed as device, system, or method aspects it should be understood that such exemplary aspects can be implemented in various devices, systems, and methods.

DETAILED DESCRIPTION

Figure 1:
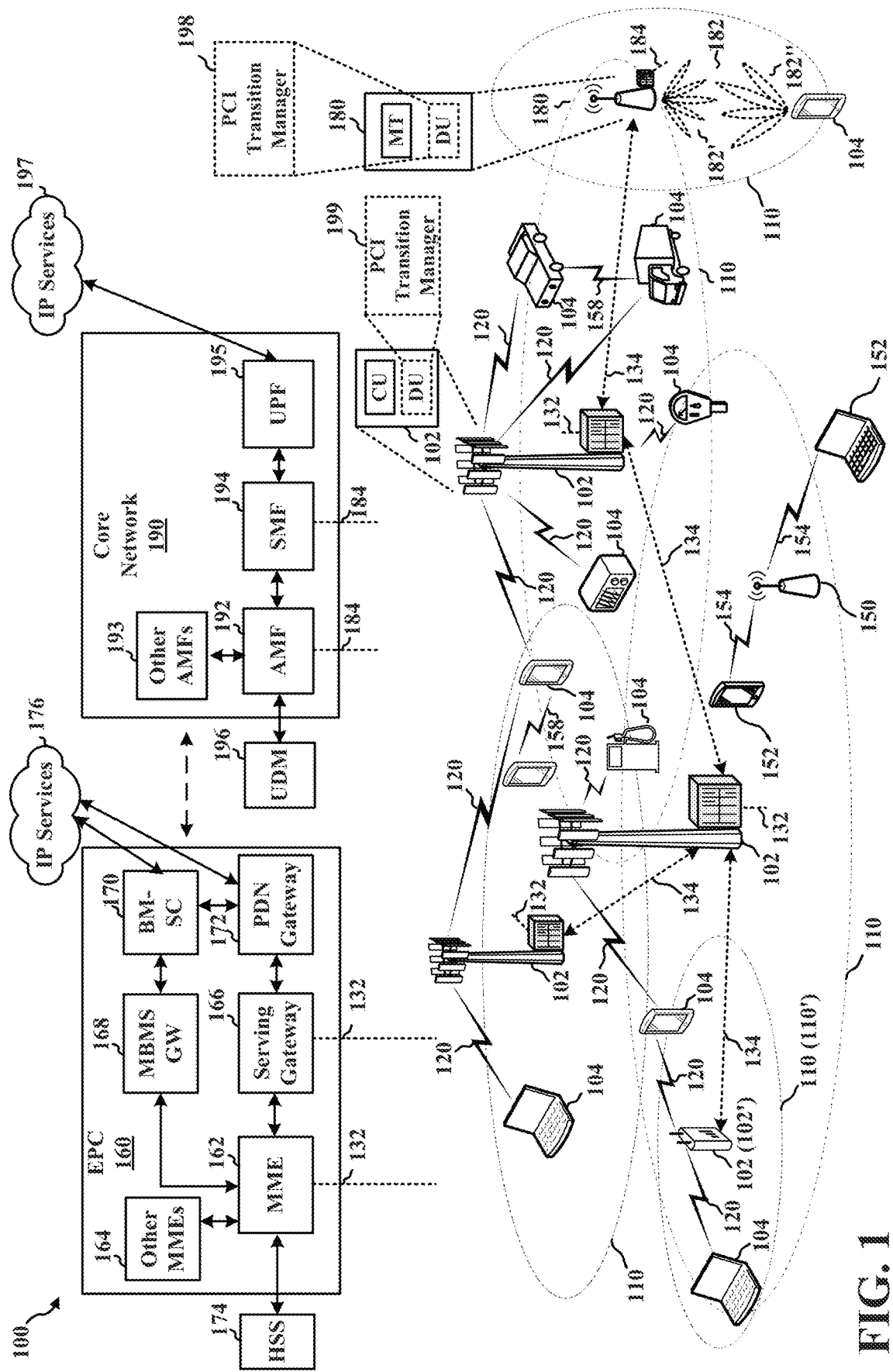
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Aspects of the present disclosure provide and enable techniques for a soft physical cell identifier (PCI) change at a network node. The network node may facilitate a change from one PCI to another PCI (e.g., via optimizing transmission signal beams) such that PCI collision with a neighboring node is avoided, and thereby, improve timing synchronization, channel estimation, and data decoding at the network node and/or the neighboring node. Aspects of disclosure relate to a network node for changing a physical cell identifier (PCI). The network node transmits a first signal based on a first PCI during a first synchronization signal block (SSB) occasion, transmits a second signal based on the first PCI during a second SSB occasion, and transitions from the first PCI to a second PCI. During a transition period, the network node transmits the first signal based on the second PCI during the first SSB occasion, and continues to transmit the second signal based on the first PCI during the second SSB occasion. After an end of the transition period, the network node continues to transmit the first signal based on the second PCI during the first SSB occasion, and ceases transmission of the second signal based on the first PCI during the second SSB occasion. Other aspects and features are also claimed and described.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), integrated access and backhaul (IAB)-donor, IAB-node, or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, IAB-donor, IAB-node, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be an IAB-node 180 including a mobile termination unit (MT) and a distributed unit (DU) and/or the base station 102 may be an IAB-donor 102 including a central unit (CU) and a distributed unit (DU). As such, the IAB-node DU may include a physical cell identifier (PCI) transition manager 198 and the IAB-donor DU may include a PCI transition manager 199. The PCI transition manager 198/199 is configured to optimize transmission beams to facilitate a soft PCI change. For example, the PCI transition manager 198/199 is configured to transmit a first signal based on a first PCI during a first synchronization signal block (SSB) occasion, transmit a second signal based on the first PCI during a second SSB occasion, transmit a third signal based on the first PCI during a third SSB occasion, wherein the first, second, and third SSB occasions are part of a set of SSB occasions in a periodically repeating time frame, and transition from the first PCI to a second PCI.

Figure 2:
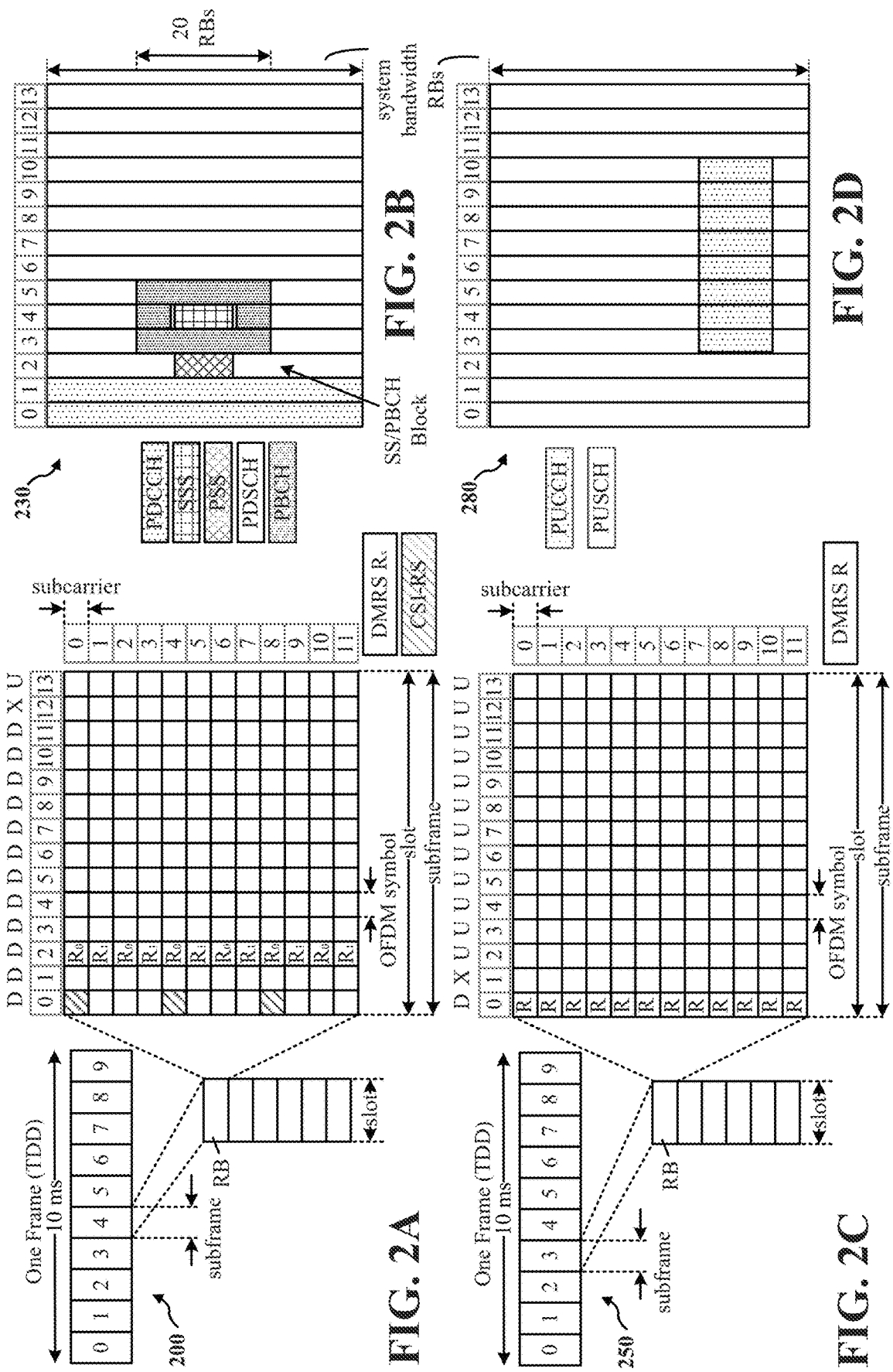
FIG. 2A is a diagram illustrating an example of a first subframe within a 5G/NR frame structure.
FIG. 2B is a diagram illustrating an example of DL channels within a 5G/NR subframe.
FIG. 2C is a diagram illustrating an example of a second subframe within a 5G/NR frame structure.
FIG. 2D is a diagram illustrating an example of UL channels within a 5G/NR subframe.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. Aspects of the disclosure related to beam optimization and/or changing a physical cell identifier (PCI) may implement signaling using the 5G/NR frame structure described with respect to FIGS. 2A, 2B, 2C, and 2D. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
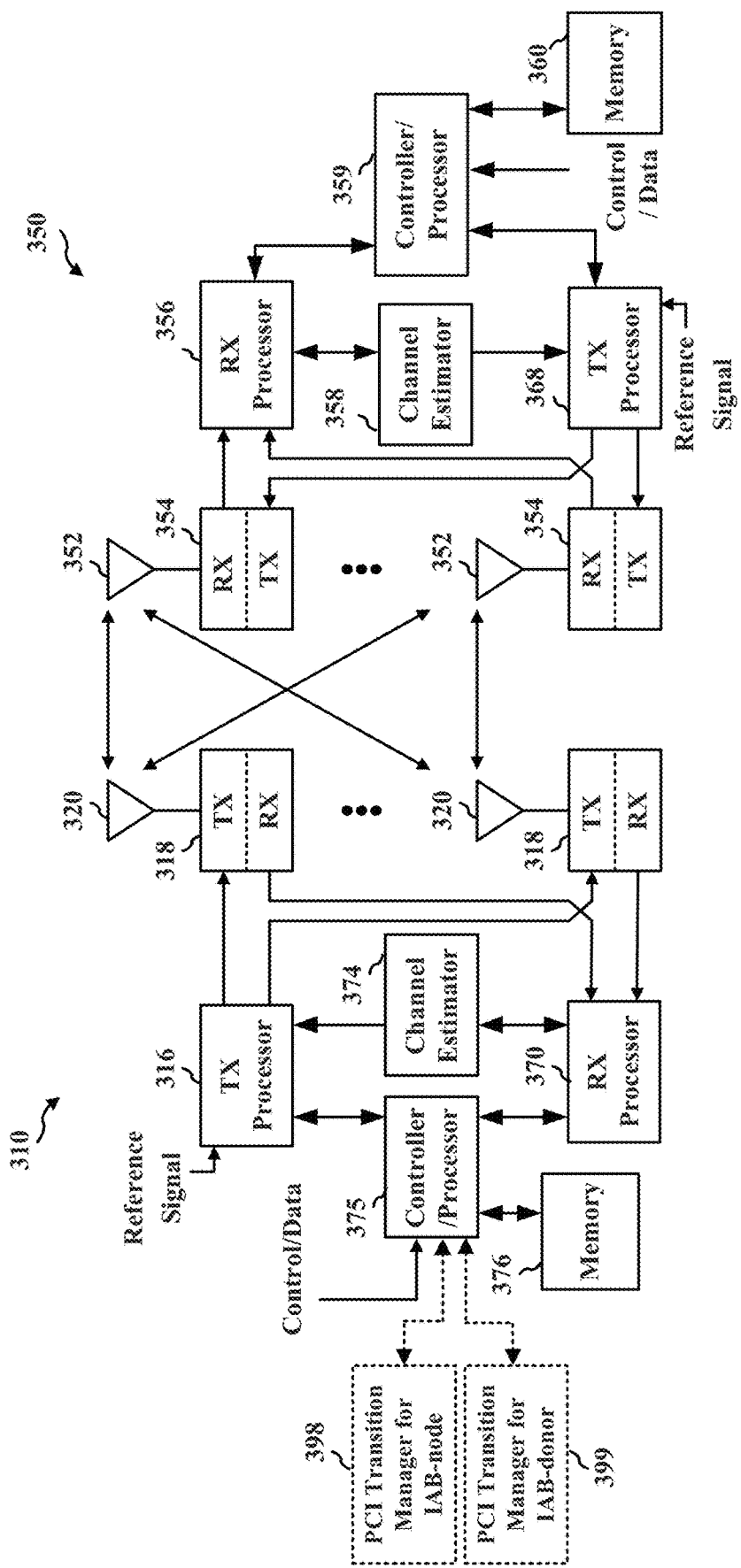
FIG. 3 is a block diagram of a base station in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the PCI transition manager 198 and/or the PCI transition manager 199 of FIG. 1. For example, if the base station 310 is the IAB-node, the base station 310 may include a PCI transition manager 398. If the base station 310 is the IAB-donor, the base station 310 may include a PCI transition manager 399. The PCI transition manager 398/399 is configured to optimize transmission beams to facilitate a soft PCI change (e.g., by transmitting a first signal based on a first PCI during a first synchronization signal block (SSB) occasion, transmitting a second signal based on the first PCI during a second SSB occasion, transmitting a third signal based on the first PCI during a third SSB occasion, wherein the first, second, and third SSB occasions are part of a set of SSB occasions in a periodically repeating time frame, and transitioning from the first PCI to a second PCI).

Figure 4:
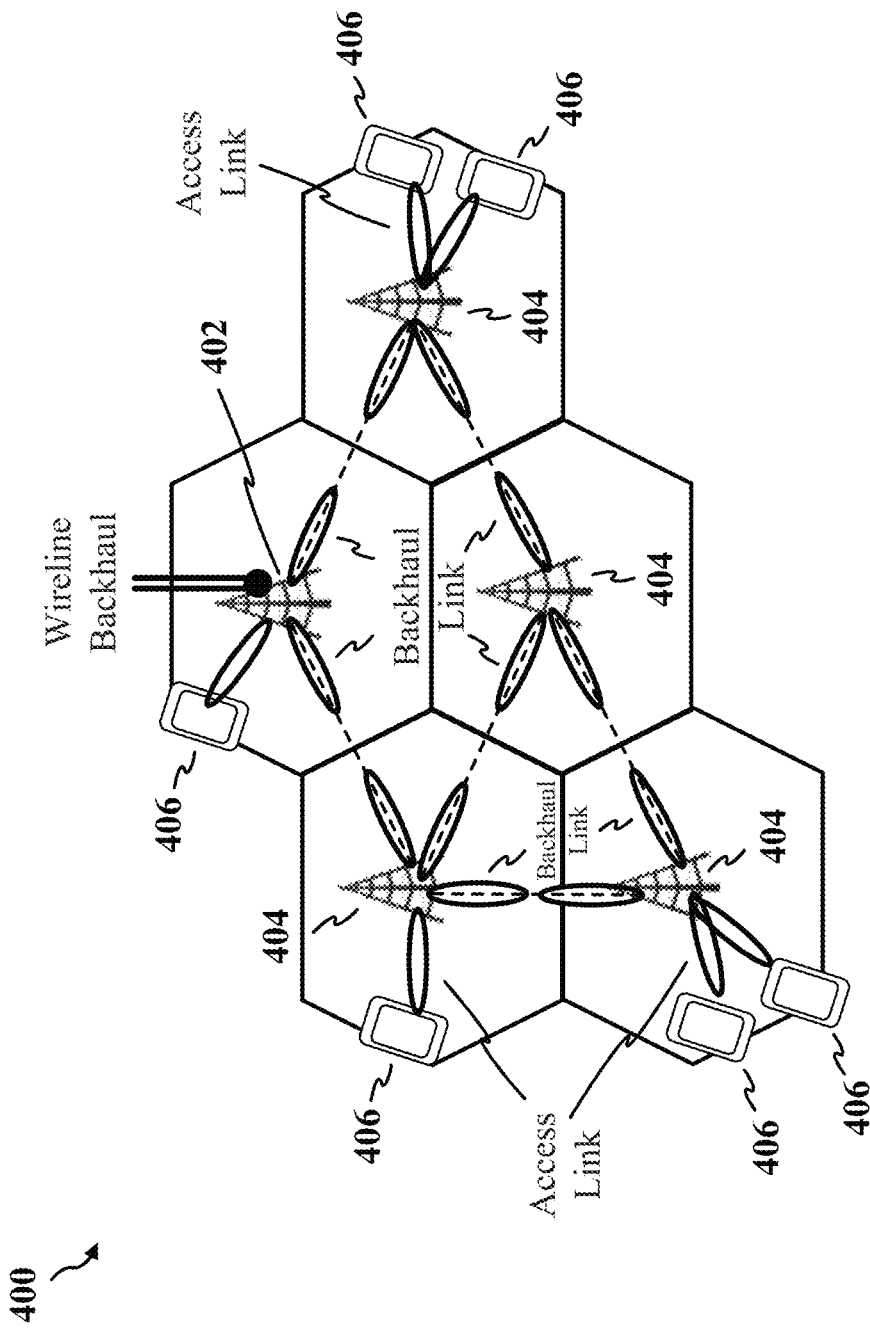
FIG. 4 illustrates an example of an integrated access and backhaul (IAB) system.

FIG. 4 illustrates an example of an integrated access and backhaul (IAB) system 400. 5G NR technologies, such as a mmWave technology, may be used to support the IAB system 400. The IAB system 400 may include one or more anchor nodes 402, one or more access/relay nodes 404, and one or more UEs 406.

In an aspect, an anchor node (also referred to as an IAB-donor) 402 may be an access node with a wireline connection to a network. A relay node (also referred to as an IAB-node) 404 may be an access node that relays traffic to and from the anchor node 402 via a single hop or multiple hops. An access/relay node 404 may be connected to a UE 406 via an access link A network of access links between access/relay nodes 404 and UEs 406 may be referred to as an access network. Access/relay nodes 404 may be connected to each other via a backhaul link A network of backhaul links between access/relay nodes may be referred to as a backhaul network.

In the IAB system 400, an access link (between an access/relay node 404 and a UE 406) and a backhaul link (between access/relay nodes 404) may share the same transmission resources for uplink and/or downlink communication. In an aspect, a framework of the access network may be reused to optimize communication operations in the IAB system.

Figure 5:
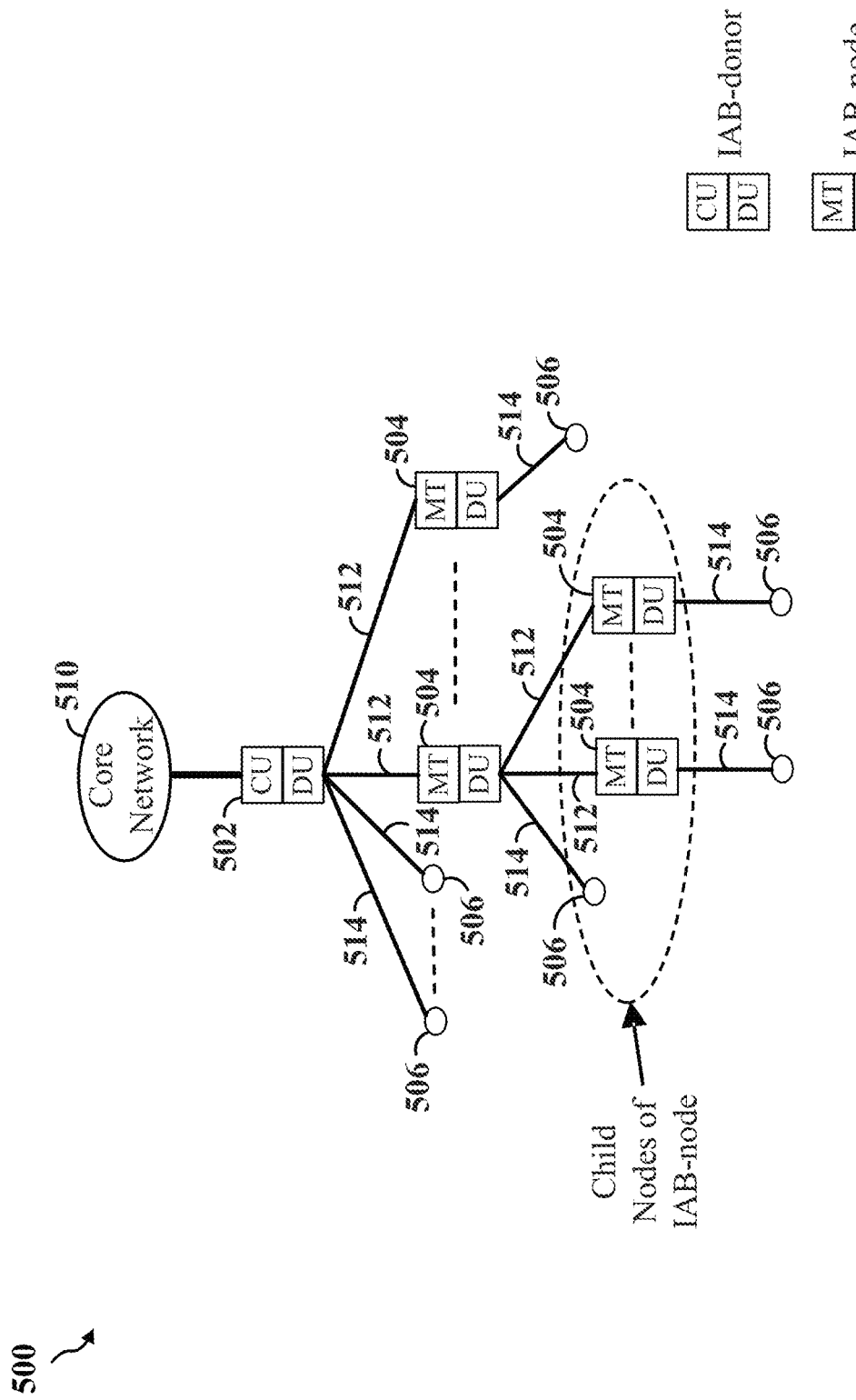
FIG. 5 illustrates an example network topology of an IAB system in accordance with aspects of the present disclosure.

FIG. 5 illustrates an example network topology 500 of an IAB system in accordance with aspects of the present disclosure. As shown, the example network topology 500 may include a core network 510, an IAB-donor 502, IAB-nodes 504, and UEs 506. The topology 500 may further include wireless backhaul links 512 between the IAB-donor 502 and an IAB-node 504 or between an IAB-node 504 and a child IAB-node 504. The topology 500 may also include wireless access links 514 between the IAB-donor 502 and a UE 506 or between an IAB-node 504 and a UE 506.

In an aspect, the IAB-donor 502 is an enhanced network node (gNB) with functions to control an IAB network. The IAB-donor 502 may include a central unit (CU) and a distributed unit (DU). The CU is a central entity that controls an entire IAB network through configuration and holds RRC/PDCP layer functions. The DU is a scheduling node that schedules child nodes associated with the IAB-donor 502. The DU holds RLC/MAC/PHY layer functions. An IAB-node 504 is an L2 relay node that may include mobile termination (MT) and DU functions. An MT unit is a scheduled node similar to a UE that is scheduled by a corresponding parent IAB-node 504 or the IAB-donor 502. The DU in the IAB-node 504 is a scheduling node that schedules child nodes associated with the IAB-donor 502.

Aspects of the present disclosure relate to a physical cell identifier (PCI) in 5G NR. The PCI is an ID for a cell, which may support a total of 1008 ID values in the 5G NR system. Notably, a PCI can be reused by multiple geographically separated cells in a network. Cells using a same PCI can be distinguished by their unique Cell Global Identifiers (NCGI). The PCI may be carried by a primary synchronization signal (PSS)/secondary synchronization signal (SSS) in a synchronization signal block (SSB).

In an aspect, the PCI may be used to determine a scrambling sequence of physical signals/channels. For example, for PBCH, PDCCH CoreSet0, or a cell-specific PDSCH transmission, the PCI can be used as a scrambling seed. For other channels, a configured scrambling seed other than the PCI may be supported.

Figure 6:
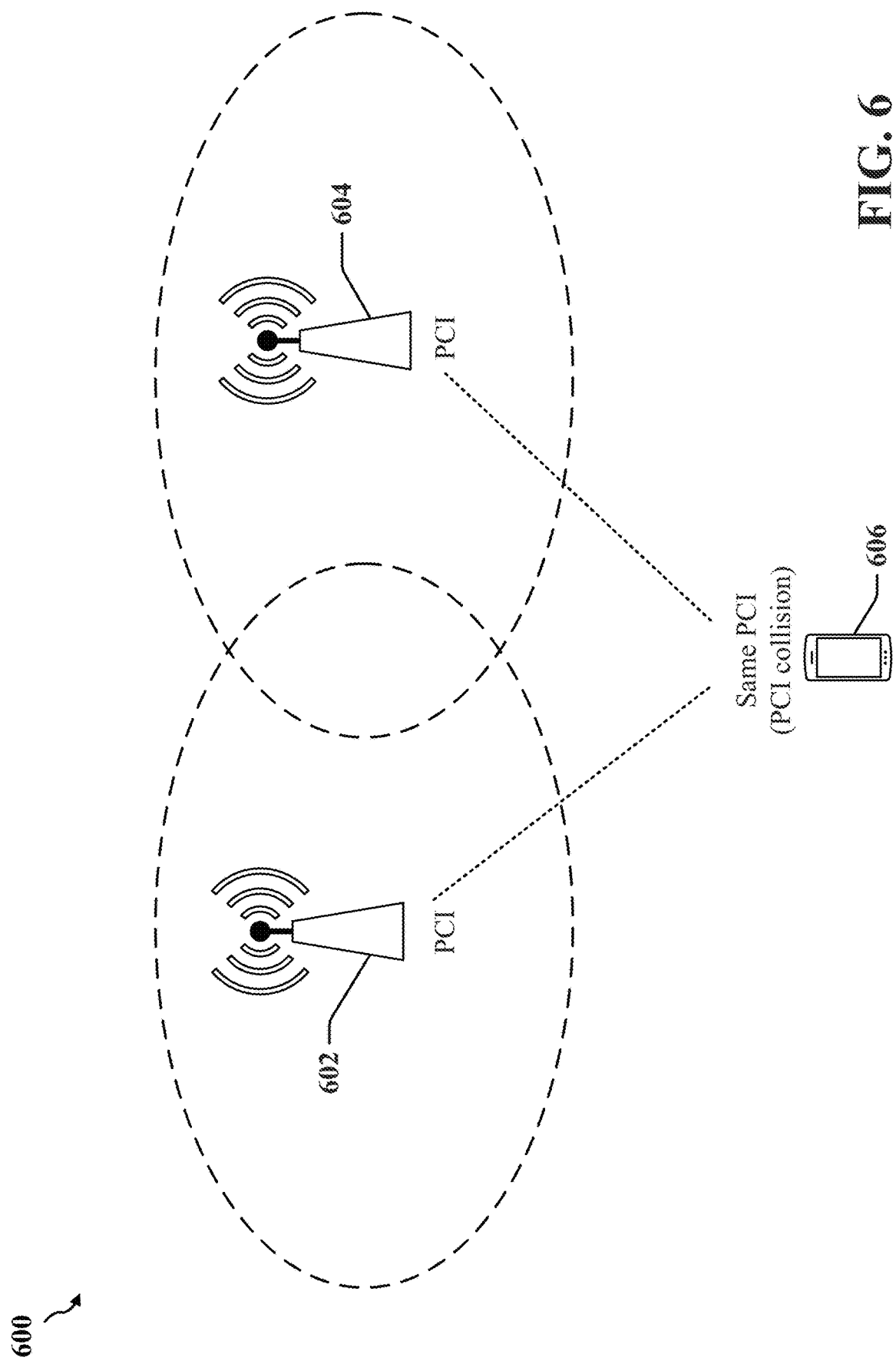
FIG. 6 is a diagram illustrating physical cell identifier (PCI) collision.

FIG. 6 is a diagram 600 illustrating physical cell identifier (PCI) collision. In FIG. 6, a first neighboring cell 602 and a second neighboring cell 604 use the same PCI to scramble reference signals transmitted to a UE 606. A PCI collision occurs when the UE 606 cannot differentiate between the reference signals transmitted from the first neighboring cell 602 and the reference signals transmitted from the second neighboring cell 604, which are both scrambled based on the same PCI. PCI collision may lead to issues regarding timing synchronization and channel estimation and cause a failure to decode data traffic transmitted from the first neighboring cell 602 and/or the second neighboring cell 604.

Figure 7:
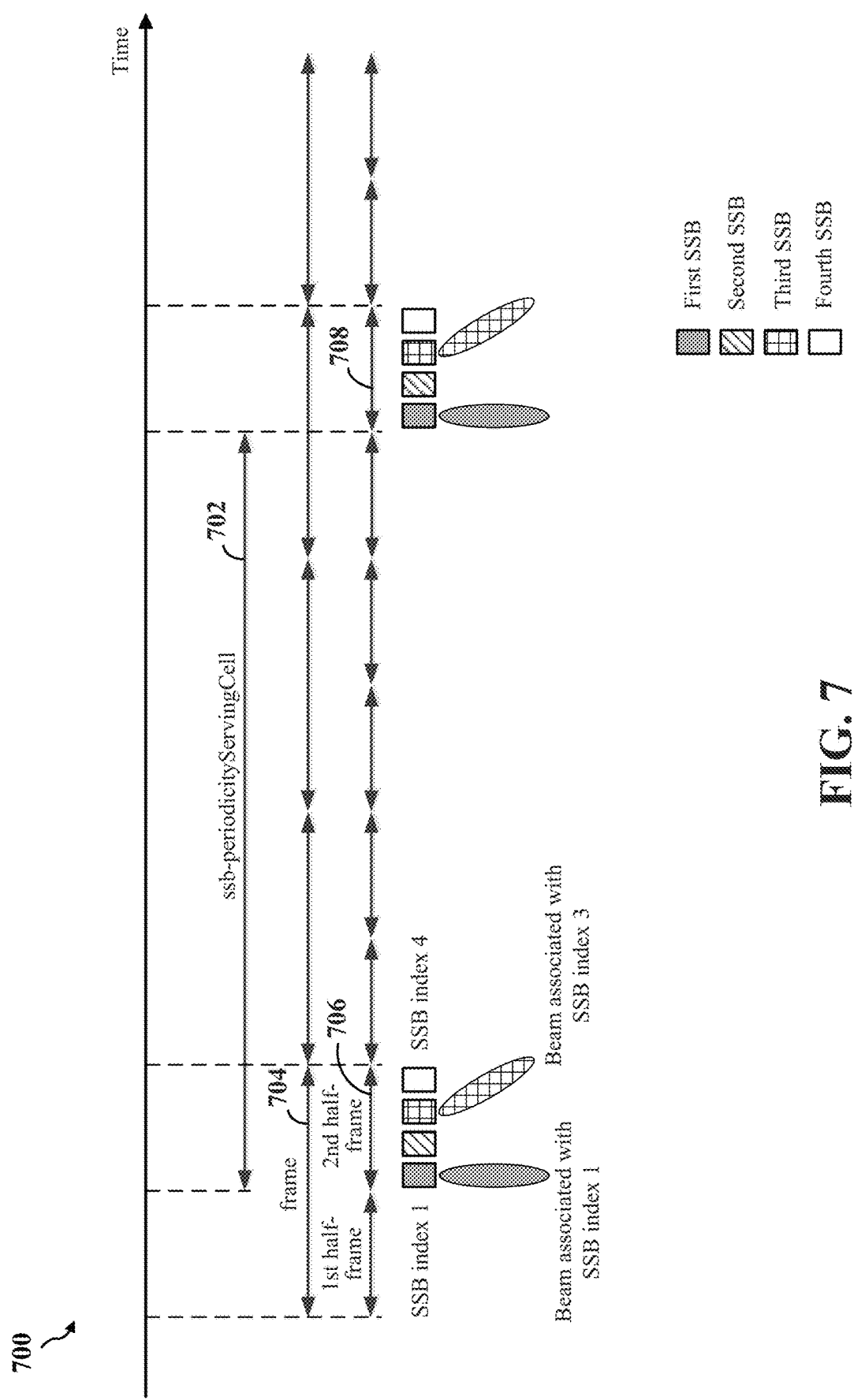
FIG. 7 is a diagram illustrating a periodicity of synchronization signal blocks (SSBs) within a serving cell in accordance with aspects of the present disclosure.

FIG. 7 is a diagram 700 illustrating a periodicity 702 of synchronization signal blocks (SSBs) within a serving cell (ssb-periodicityServingCell). As shown, a frame 704 may include a first half-frame and a second half-frame. A set of SSB occasions (e.g., 4 SSBs) may be provided within a single half-frame (e.g., second half-frame). For example, in a second half-frame 706, a first SSB having a first SSB index (SSB index 1), a second SSB having a second SSB index (SSB index 2), a third SSB having third SSB index (SSB index 3), and a fourth SSB having a fourth SSB index (SSB index 4) are provided. As further shown in FIG. 7, a transmission direction of a beam associated with the first SSB index (SSB index 1) and a transmission direction of a beam associated with the third SSB index (SSB index 3) are depicted. In an aspect, the frame 704 is a periodically repeating time frame. As such, the set of SSB occasions may periodically be provided according to the periodicity 702, e.g., in a later-occurring second half-frame 708. Moreover, the beams associated with the SSB indices may be periodically transmitted based on the periodicity 702.

In an aspect, a UE may identify an SSB index corresponding to a beam with a strongest signal strength. Moreover, an SSB transmission pattern may be indicated in ssb-PositionsInBurst (e.g., as part of a SIB1 message or RRC dedicated signaling).

Figure 8:
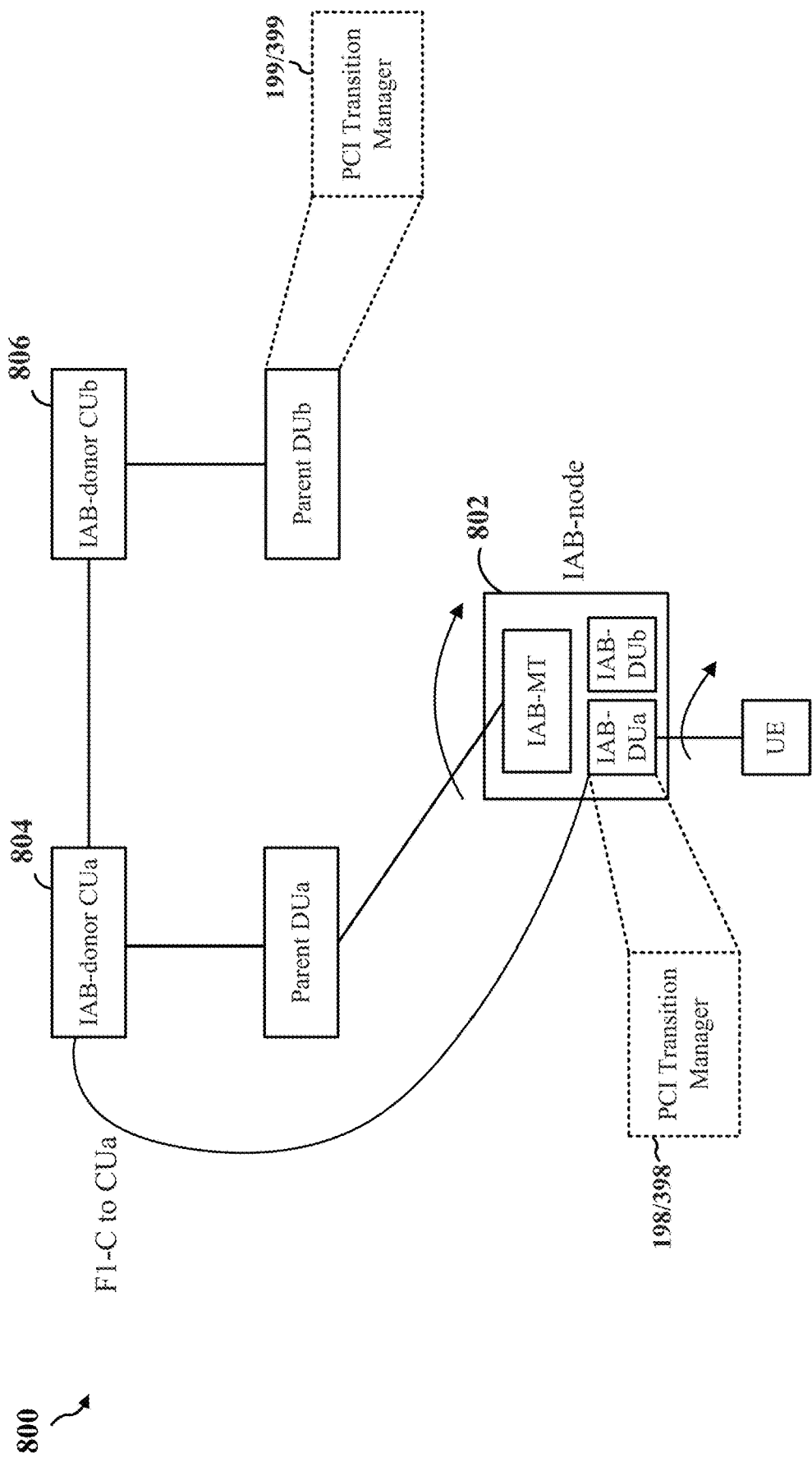
FIG. 8 is a diagram illustrating movement of a network node in accordance with aspects of the present disclosure.

FIG. 8 is a diagram 800 illustrating movement of a network node. In an aspect, some network nodes, such as an IAB-node 802 may move around in a network. For example, such mobile network nodes may be installed on a bus, train, or taxi. A network may include a mixture of stationary and mobile nodes. A mobile IAB-node may be a leaf node or have child IAB-nodes.

In an aspect, the IAB-node 802 may be a stationary node at a border of a first gNB 804 and a second gNB 806, wherein an MT unit within the IAB-node 802 (IAB-MT) may perform handover due to low link quality. In another aspect, the IAB-node 802 may be a mobile node that moves from a territory of the first gNB 804 to a territory of the second gNB 806. In either scenario, migration from the first gNB 804 to the second gNB 806 may involve a PCI change to avoid PCI collision. Accordingly, aspects of the disclosure provide and enable techniques for reconfiguring a new PCI to avoid PCI collision when a network node migrates from one controlling node to another controlling node. For example, the IAB-node 802 may include the PCI transition manager 198/398 configured to optimize transmission beams to facilitate a soft PCI change (e.g., by transmitting a first signal based on a first PCI during a first synchronization signal block (SSB) occasion, transmitting a second signal based on the first PCI during a second SSB occasion, transmitting a third signal based on the first PCI during a third SSB occasion, wherein the first, second, and third SSB occasions are part of a set of SSB occasions in a periodically repeating time frame, and transitioning from the first PCI to a second PCI). In a further example, a controlling node, such as the first gNB 804 (IAB-donor DU) and/or the gNB 806 (IAB-donor DU), may include the PCI transition manager 199/399 to facilitate the soft PCI change as described herein.

Figure 9:
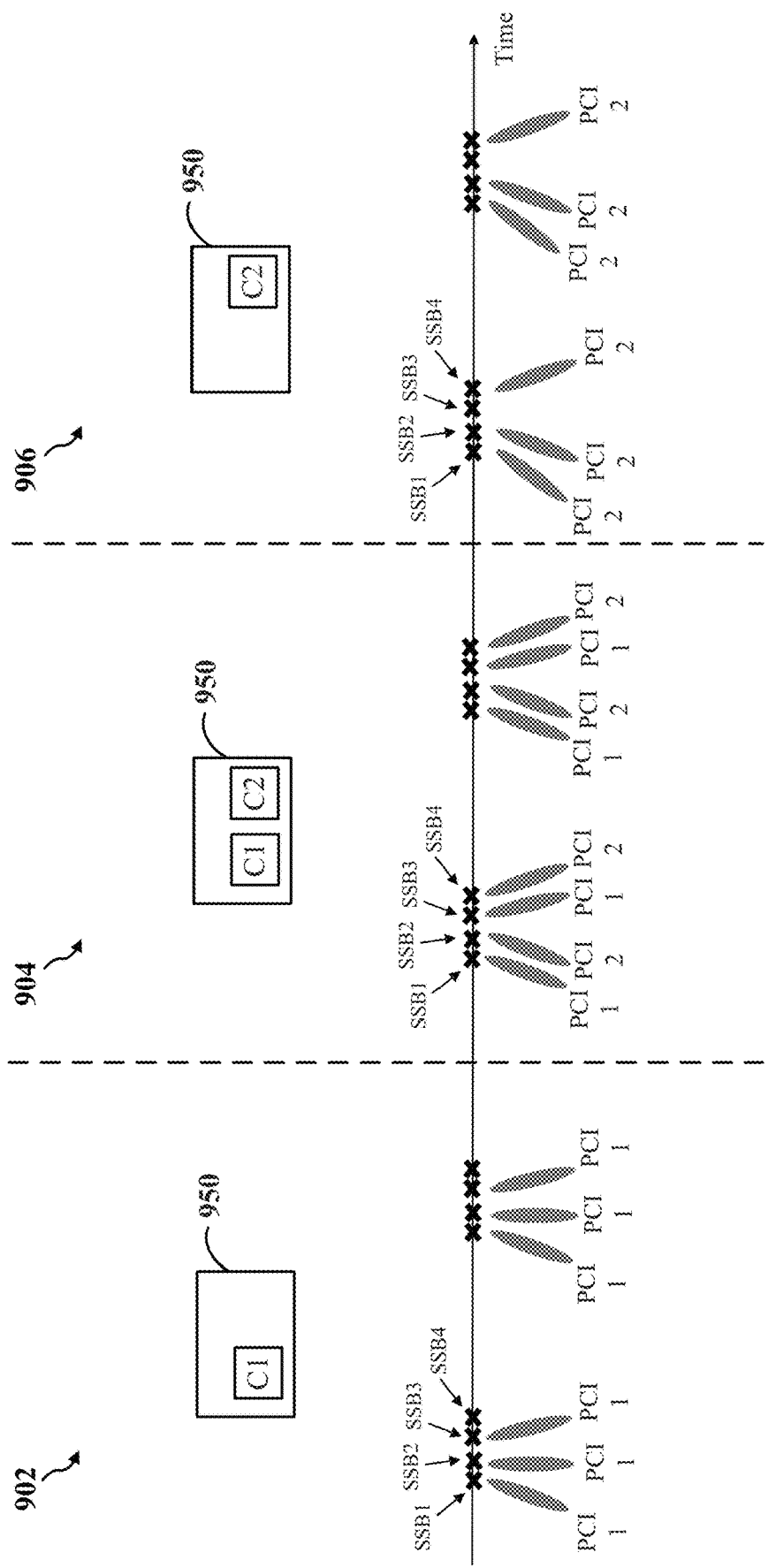
FIG. 9 illustrates an example of three phases associated with a soft PCI change at a network node in accordance with aspects of the present disclosure.

FIG. 9 illustrates an example of three phases associated with a soft PCI change at a network node. The network node may be a gNB, a gNB-DU, an IAB-donor DU, or an IAB-node DU, for example. During a first phase 902, before a beginning of the soft PCI change, a network node 950 may serve a current cell C1 (old cell) based on a current PCI (old PCI). For example, the network node 950 may periodically transmit (broadcast) the current PCI on SSB indices 1, 2, and 3 within a time frame (e.g. half-frame). As shown during the first phase 902, beams corresponding to the current PCI (PCI 1) may be periodically transmitted (broadcast) on SSB index 1 (SSB1), SSB index 2 (SSB2), and SSB index 3 (SSB3).

During a second phase 904, during the soft PCI change, the network node 950 may serve the current cell C1 (old cell) based on the current PCI (old PCI) and serve a new cell C2 based on a new PCI. For example, the network node 950 may periodically transmit (broadcast) the current PCI on SSB indices 1 and 3 within the time frame. As shown during the second phase 904, beams corresponding to the current PCI (PC1) may be periodically transmitted (broadcast) on SSB index 1 (SSB1) and SSB index 3 (SSB3). Moreover, the network node 950 may periodically transmit (broadcast) the new PCI on SSB indices 2 and 4 within the time frame. As shown during the second phase 904, beams corresponding to the new PCI (PC2) may be periodically transmitted (broadcast) on SSB index 2 (SSB2) and SSB index 4 (SSB4).

During a third phase 906, after an end of the soft PCI change, the network node 950 may serve the new cell C2 based on the new PCI. For example the network node 950 may periodically transmit (broadcast) the new PCI on SSB indices 1, 2, and 4 within the time frame. As shown during the third phase 906, beams corresponding to the new PCI (PCI2) may be periodically transmitted (broadcast) on SSB index 1 (SSB1), SSB index 2 (SSB2), and SSB index 4 (SSB4).

Figure 10:
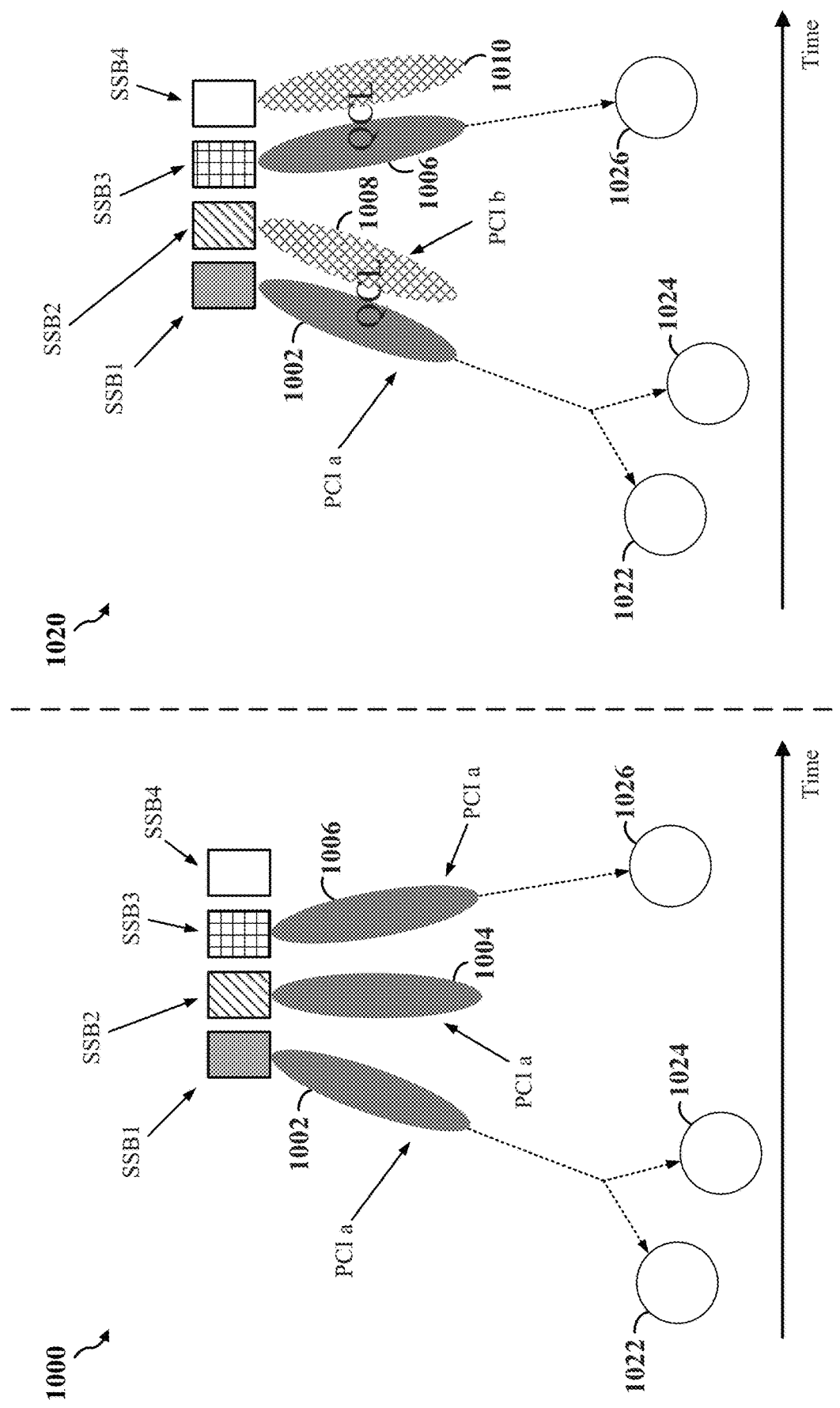
FIGS. 10 and 11 illustrate examples of optimizing transmission beams across phases associated with a soft PCI change at a network node in accordance with aspects of the present disclosure.
Figure 11:
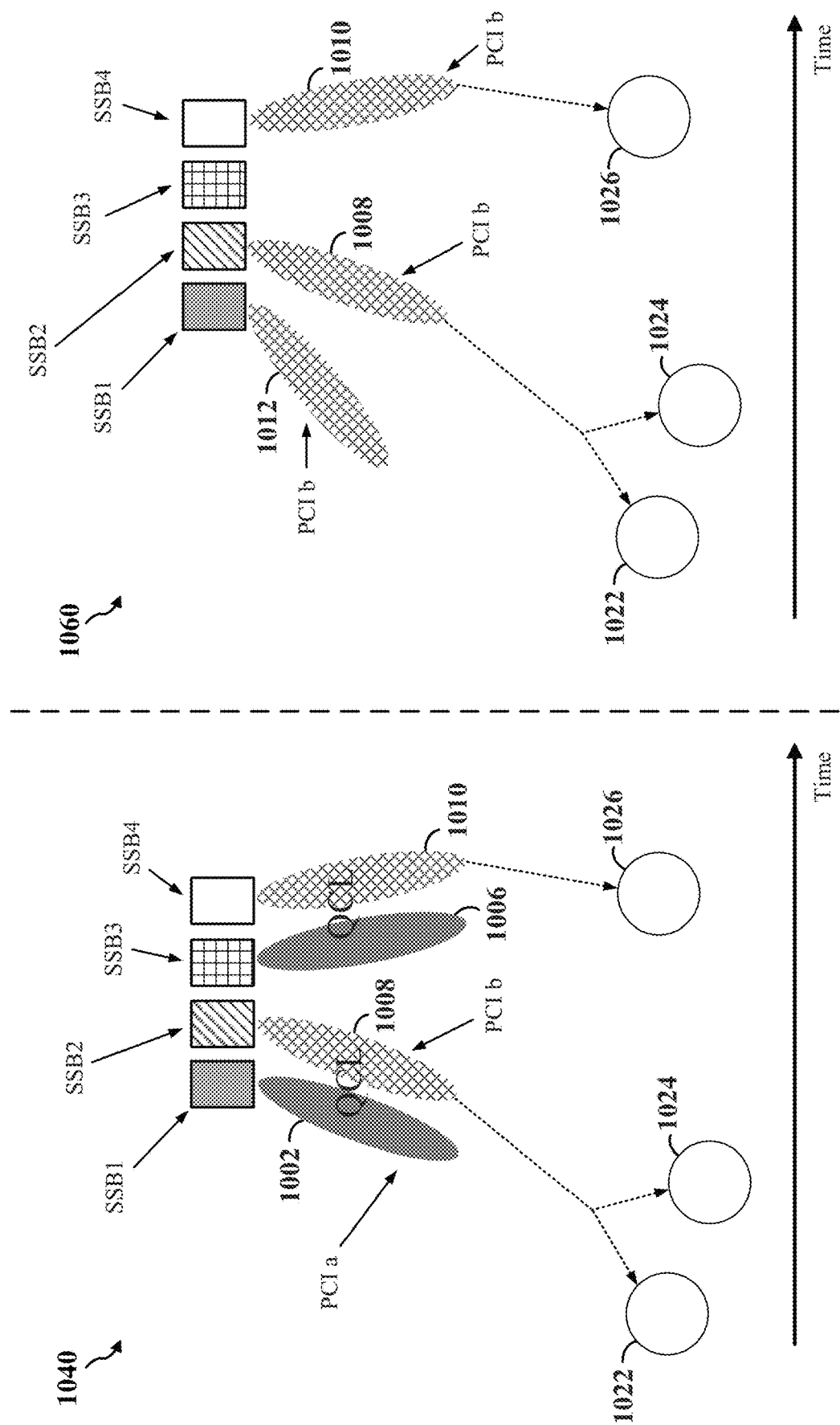

FIGS. 10 and 11 illustrate examples of optimizing transmission beams across phases associated with a soft PCI change at a network node. The network node may be a gNB, a gNB-DU, an IAB-donor DU, or an IAB-node DU, for example. Referring to FIG. 10, during a first phase 1000 of the soft PCI change, the network node may periodically transmit a first beam 1002 associated with a first SSB index (SSB1) and a first PCI (PCI a) within a time frame. A first child node (Child 1) 1022 and a second child node (Child 2) 1024 may be served on the first beam 1002 associated with the SSB1 and the PCI a. Moreover, the network node may periodically transmit a second beam 1004 associated with a second SSB index (SSB2) and the first PCI (PCI a) within the time frame. The network node may also periodically transmit a third beam 1006 associated with a third SSB index (SSB3) and the first PCI (PCI a) within the time frame. A third child node (Child 3) 1026 may be served on the third beam 1006 associated with the SSB3 and the PCI a.

Still referring to FIG. 10, during a second phase 1020 of the soft PCI change, the network node may continue to periodically transmit the first beam 1002 associated with the first SSB index (SSB1) and the first PCI (PCI a) and periodically transmit the third beam 1006 associated with the third SSB index (SSB3) and the first PCI (PCI a) within the time frame. Moreover, the network node may cease transmission of the second beam 1004 associated with the second SSB index (SSB2) and the first PCI (PCI a), e.g., since no child nodes are being served by such beam. As such, the network node may then periodically transmit a fourth beam 1008 associated with the second SSB index (SSB2) and a second PCI (PCI b) and periodically transmit a fifth beam 1010 associated with a fourth SSB index (SSB4) and the second PCI (PCI b) within the time frame. In an aspect, the first beam 1002 may be quasi-collocated (QCL) with the fourth beam 1008, and the third beam 1006 may be quasi-collocated (QCL) with the fifth beam 1010. In a further aspect, the first beam 1002 is transmitted in the same direction as the fourth beam 1008, and the third beam 1006 is transmitted in the same direction as the fifth beam 1010.

Now referring to FIG. 11, during a third phase 1040 of the soft PCI change, the network node may serve the first child node (Child 1) 1022 and the second child node (Child 2) 1024 on the fourth beam 1008 associated with the SSB2 and the second PCI (PCI b) (instead of the first beam 1002 associated with the SSB1 and the first PCI (PCI a) as previously shown in FIG. 10). Moreover, the network node may serve the third child node (Child 3) 1026 on the fifth beam 1010 associated with the SSB4 and the second PCI (PCI b) (instead of the third beam 1006 associated with the SSB3 and the first PCI (PCI a) as previously shown in FIG. 10).

Still referring to FIG. 11, during a fourth phase 1060 of the soft PCI change, the network node may continue to periodically transmit the fourth beam 1008 associated with the second SSB index (SSB2) and the second PCI (PCI b) and periodically transmit the fifth beam 1010 associated with the fourth SSB index (SSB4) and the second PCI (PCI b) within the time frame. Moreover, the network node may cease transmission of the first beam 1002 associated with the first SSB index (SSB1) and the first PCI (PCI a) and cease transmission of the third beam 1006 associated with the third SSB index (SSB3) and the first PCI (PCI a), e.g., since no child nodes are being served by such beams. As such, the network node may then periodically transmit a sixth beam 1012 associated with the first SSB index (SSB1) and the second PCI (PCI b) within the time frame.

Aspects of the present disclosure relate to a network node (e.g., gNB, gNB-DU, IAB-donor DU, or IAB-node DU) performing a soft PCI change from a first PCI to a second PCI. In an aspect, prior to a transition from the first PCI to the second PCI (transition phase or period), the network node may periodically broadcast (transmit) the first PCI on a set of SSB occasions including a first SSB occasion and a second SSB occasion within a half-frame. During the transition phase, the network node may periodically broadcast the second PCI on the first SSB occasion and continue to periodically broadcast the first PCI on the second SSB occasion within the half-frame. After an end of the transition phase, the network node may stop broadcasting the first PCI on the second SSB occasion and continue to periodically broadcast the second PCI on the first SSB occasion within the half-frame.

In a further aspect, after the end of the transition phase, the network node may periodically transmit the second PCI on the second SSB occasion within the half-frame. Moreover, during and/or after end of the transition phase, the network node may also periodically transmit the second PCI on a third SSB occasion of the set of SSB occasions within the half-frame where the first PCI is not initially broadcast before the transition phase.

In an aspect, when transmitting the first PCI prior to the transition phase, the network node may use a first beam on the first SSB occasion and a second beam on the second SSB occasion. The first beam and the second beam may be transmitted in the same direction.

In an aspect, the network node may select the first SSB occasion to broadcast the second PCI during the transition based on one or more conditions being met. For example, the conditions may include: 1) the network node serves no child nodes (e.g., IAB-node MT or UE) on the first beam and serves one or more child nodes on the second beam; 2) the network node serves a number of children on the first beam that is less than a number of children served on the second beam; 3) the network node delivers a total throughput to child nodes served on the first beam that is less than the total throughput delivered to child node served on the second beam, wherein the throughput may be directional; 4) the network node provides a service to child nodes served on the first beam that has a lower quality of service (QoS) requirement than a service provided to child nodes served on the second beam; 5) the network node serves a child node on the first beam with a lower link quality than a link quality of a child node served on the second beam; 6) communication between the network node and a child node served on the first beam incurs more interference than communication between the network node and a child served on the second beam; and 7) communication between the network node and a child node served on the first beam causes more interference to communication of another cell served by a second network node (e.g., gNB, gNB-DU, IAB-donor DU, or IAB-node DU) than communication between the network node and a child node served on the second beam.

In an aspect, the network node may select the first SSB occasion to broadcast the second PCI during the transition phase such that no SIB1 update associated with the first PCI is incurred. For example, a compressed bitmap in SIB1 is not impacted.

In an aspect, the network node may receive a configuration from a controlling node (e.g., gNB-CU) based on which the network node selects the first SSB occasion to broadcast the second PCI during the transition phase. The configuration may include: 1) and index of the first SSB occasion; 2) an indication of an SSB area that is associated with the first SSB occasion or the first beam broadcast on the first SSB occasion; 3) a threshold of the number of served child nodes, where a number of child nodes served by the first beam is less than or equal to the threshold, and where the threshold may be zero; 4) a threshold of a total throughput delivered to served child nodes, where a total throughput delivered to child nodes served by the first beam is less than the threshold, and where the threshold may be directional; 5) a condition associated with a QoS requirement, where a service provided to child nodes served on the first beam satisfies the condition (e.g., QoS requirement: RLC CH QoS class); and 6) channel quality information, where the network node serves a child node on the first beam with a lower link quality than that carried by the configuration. The controlling node (e.g., gNB-CU) may forward the configuration of a second network node (e.g., second gNB, gNB-DU, IAB-donor DU, or IAB-node DU) to the network node.

In an aspect, the network node may start the soft PCI change based on an indication from the controlling node or detecting the first PCI as transmitted by a different network node. The network node may also indicate the start of the soft PCI change to the controlling node.

In an aspect, the network node may be a distributed unit (DU) of an IAB-node. Moreover, the soft PCI change may be triggered by a handover command/cell group change for a collocated mobile termination (MT) unit of the IAB-node.

In an aspect, the network node may perform the soft PCI change together with a migration of a child node (e.g., IAB-node MT or UE) from the first PCI to the second PCI. Accordingly, the child node may be served on a second beam, and the network node periodically transmits the second PCI on the first SSB occasion using a beam that is quasi-collocated (QCL) with the second beam. Alternatively, the child node may be served on a first beam, and the gNB-DU periodically transmits the second PCI on the first SSB occasion using a beam that is quasi-collocated (QCL) with the first beam.

In an aspect, the soft PCI change may include multiple transition phases. For example, prior to a first transition phase, the network node may transmit the first PCI on a first SSB occasion, a second SSB occasion, and a third SSB occasion. During the first transition phase, the network node may transmit the second PCI on the first SSB occasion and transmit the first PCI on the second SSB occasion and the third SSB occasion. During a second transition phase, the network node may transmit the second PCI on the first SSB occasion and the second SSB occasion and transmit the first PCI on the third SSB occasion. At an end of the second transition phase, the network node may transmit the second PCI on the first SSB occasion and the second SSB occasion, and cease transmission of the first PCI on the third SSB occasion. In an aspect, at the end of the second transition phase, the network node may also transmit the second PCI on the third SSB occasion (where the first PCI is no longer transmitted).

In an aspect, in the case of multiple transitions, the network node may select the first SSB occasion and the second SSB occasion based on one or more conditions or by receiving a configuration as described above. For example, selection may be based on a configuration received from a controlling node (e.g., gNB-CU) that provides and index of the first SSB occasion and an index of the second SSB occasion. In another example, selection may be based on the network node switching a PCI on the first SSB occasion where no child nodes are served on a first beam associated with the first SSB occasion. In a further example, selection may be based on child nodes served on a second beam associated with the second SSB occasion migrating to the second PCI, where the child nodes are served on a beam that is quasi-collocated (QCL) with the second beam and is periodically broadcast on the first SSB occasion. In another example, selection may be based on no child nodes being served on the second beam, and thus, the network node switches PCI on the second SSB occasion and so on.

In an aspect, the network node may perform a SIB1 update during a transition phase of the soft PCI change. The network node may update a bitmap of indices of the SSB occasions in which the first PCI is broadcast. The network node may update a quasi-collocated (QCL) relationship among beams associated with the SSB occasions in which the first PCI is broadcast. The network node may send an updated SIB1 message to the controlling node (e.g., gNB-CU). The network node may update a SIB1 broadcast.

In an aspect, the network node may send a SIB1 message corresponding to the second PCI during a transition phase of the soft PCI change and send an updated SIB1 at the end of the soft PCI change. The controlling node may send the updated SIB1 during a transition phase of the soft PCI change in a dedicated manner to a connected or idle child node. The network node may refrain from sending a SIB1 update during a transition phase of the soft PCI change, where a new SIB1 message corresponding to the second PCI is broadcast at the end of the soft PCI change. The network node may send a short message to a child node or send a page to an idle UE to indicate an update of system information.

In an aspect, the network node may perform a SIB1 update, send a short message, or send a paging message during a transition phase of the soft PCI change based on a configuration from the controlling node. In an aspect, the configuration may be conditional (e.g., depending on a length of the transition phase).

Figure 12:
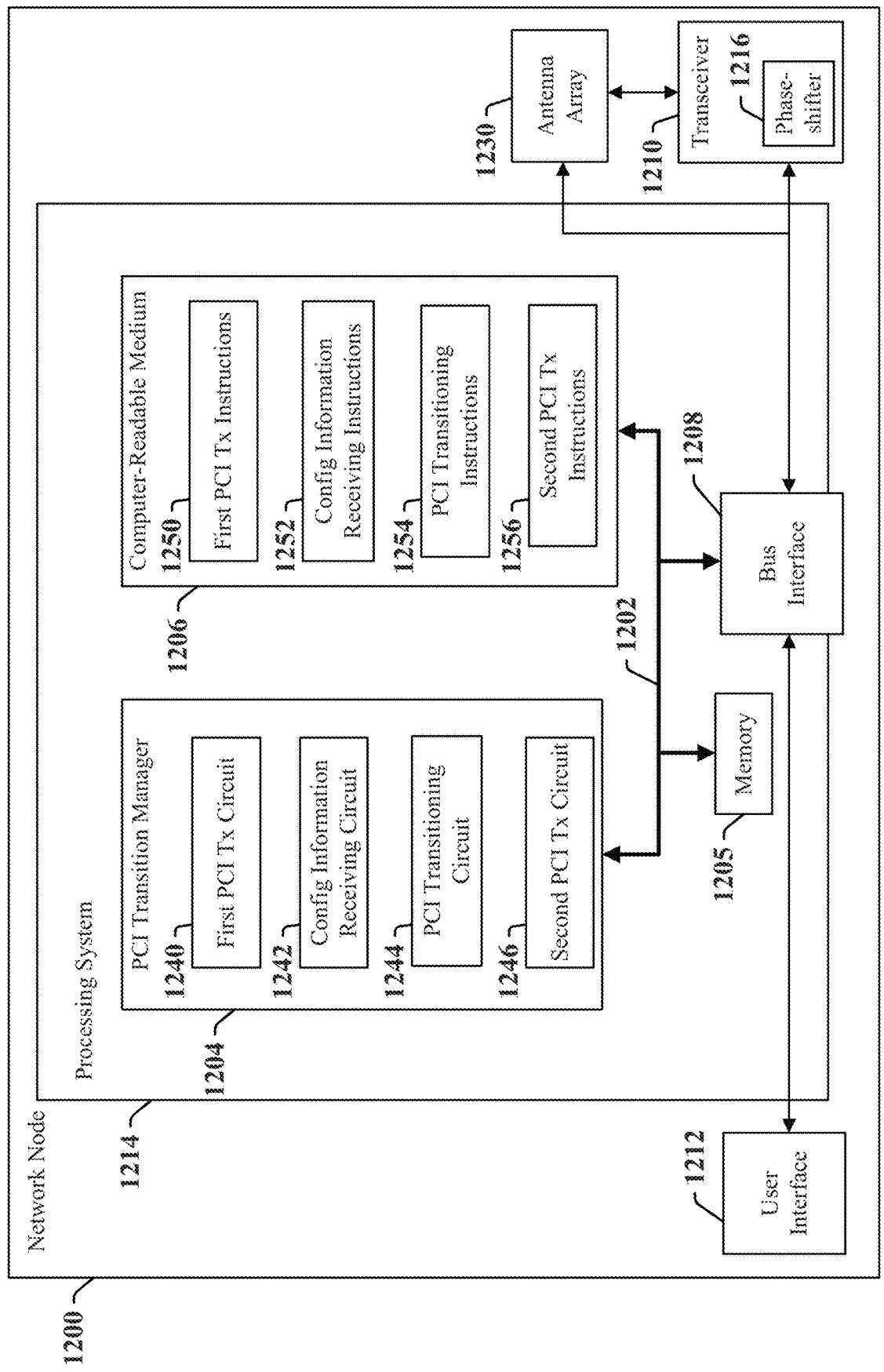
FIG. 12 is a block diagram illustrating an example of a hardware implementation for an exemplary network node employing a processing system in accordance with aspects of the present disclosure.

FIG. 12 is a block diagram illustrating an example of a hardware implementation for an exemplary network node 1200 employing a processing system 1214. For example, the network node 1200 may be a base station, gNB, gNB-DU, IAB-donor DU, or IAB-node DU, as illustrated in any one or more of FIGS. 1, 3-6, 8, and/or 9. The network node 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 1200 may be configured to perform any one or more of the functions described herein. That is, the processor 1204, as utilized in a network node 1200, may include the PCI transition manager 198/398 and/or the PCI transition manager 199/399 and used to implement any one or more of the processes and procedures described below and illustrated in FIGS. 13 and 14.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. In some examples, the transceiver 1210 may include a phase-shifter 1216 for digital and/or analog beamforming via one or more antenna array(s) 1230. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 (e.g., PCI transition manager 198/398 or PCI transition manager 199/399) may include first PCI transmitting circuitry 1240 configured for various functions, including, for example transmitting a first signal based on a first physical cell identifier (PCI) during a first synchronization signal block (SSB) occasion, transmitting a second signal based on the first PCI during a second SSB occasion, and transmitting a third signal based on the first PCI during a third SSB occasion via the transceiver 1210 and the antenna array 1230 (e.g., using the phase-shifter 1216), wherein the first, second, and third SSB occasions are part of a set of SSB occasions in a periodically repeating time frame. For example, the first PCI transmitting circuitry 1240 may be configured to implement one or more of the functions described below in relation to FIG. 13, including, e.g., blocks 1302 and 1304, and in relation to FIG. 14, e.g., blocks 1402, 1404, and 1406. The processor 1204 may also include configuration information receiving circuitry 1242 configured for various functions, including, for example, receiving configuration information from a controlling node. For example, the configuration information receiving circuitry 1242 may be configured to implement one or more of the functions described below in relation to FIG. 13, including, e.g., block 1306, and in relation to FIG. 14, including, e.g., block 1408. The processor 1204 may also include PCI transitioning circuitry 1244 configured for various functions, including, for example, selecting the first SSB occasion to transmit the first signal based on a second PCI during a transition period, selecting the first SSB occasion to transmit the first signal based on the second PCI during the first transition period and the second SSB occasion to transmit the second signal based on the second PCI during a second transition period, and transitioning from the first PCI to the second PCI via the transceiver 1210 and the antenna array 1230 (e.g., using the phase-shifter 1216). For example, the PCI transitioning circuitry 1244 may be configured to implement one or more of the functions described below in relation to FIG. 13, including, e.g., blocks 1308 and 1310, and in relation to FIG. 14, including, e.g., blocks 1410 and 1412. The processor 1204 may also include second PCI transmitting circuitry 1246 configured for various functions, including, for example, transitioning from the first PCI to the second PCI via the transceiver 1210 and the antenna array 1230 (e.g., using the phase-shifter 1216). For example, the second PCI transmitting circuitry 1246 may be configured to implement one or more of the functions described below in relation to FIG. 13, including, e.g., block 1310, and in relation to FIG. 14, including, e.g., block 1412.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include first PCI transmitting instructions 1250 configured for various functions, including, for example transmitting a first signal based on a first physical cell identifier (PCI) during a first synchronization signal block (SSB) occasion, transmitting a second signal based on the first PCI during a second SSB occasion, and transmitting a third signal based on the first PCI during a third SSB occasion, wherein the first, second, and third SSB occasions are part of a set of SSB occasions in a periodically repeating time frame. For example, the first PCI transmitting instructions 1250 may be configured to implement one or more of the functions described below in relation to FIG. 13, including, e.g., blocks 1302 and 1304, and in relation to FIG. 14, e.g., blocks 1402, 1404, and 1406. The computer-readable storage medium 1206 may also include configuration information receiving instructions 1252 configured for various functions, including, for example, receive configuration information from a controlling node. For example, the configuration information receiving instructions 1252 may be configured to implement one or more of the functions described below in relation to FIG. 13, including, e.g., block 1306, and in relation to FIG. 14, including, e.g., block 1408. The computer-readable storage medium 1206 may also include PCI transitioning instructions 1254 configured for various functions, including, for example, selecting the first SSB occasion to transmit the first signal based on a second PCI during a transition period, selecting the first SSB occasion to transmit the first signal based on the second PCI during the first transition period and the second SSB occasion to transmit the second signal based on the second PCI during a second transition period, and transitioning from the first PCI to the second PCI. For example, the PCI transitioning instructions 1254 may be configured to implement one or more of the functions described below in relation to FIG. 13, including, e.g., blocks 1308 and 1310, and in relation to FIG. 14, including, e.g., blocks 1410 and 1412. The computer-readable storage medium 1206 may also include second PCI transmitting instructions 1256 configured for various functions, including, for example, transitioning from the first PCI to the second PCI. For example, the second PCI transmitting instructions 1256 may be configured to implement one or more of the functions described below in relation to FIG. 13, including, e.g., block 1310, and in relation to FIG. 14, including, e.g., block 1412.

Figure 13:
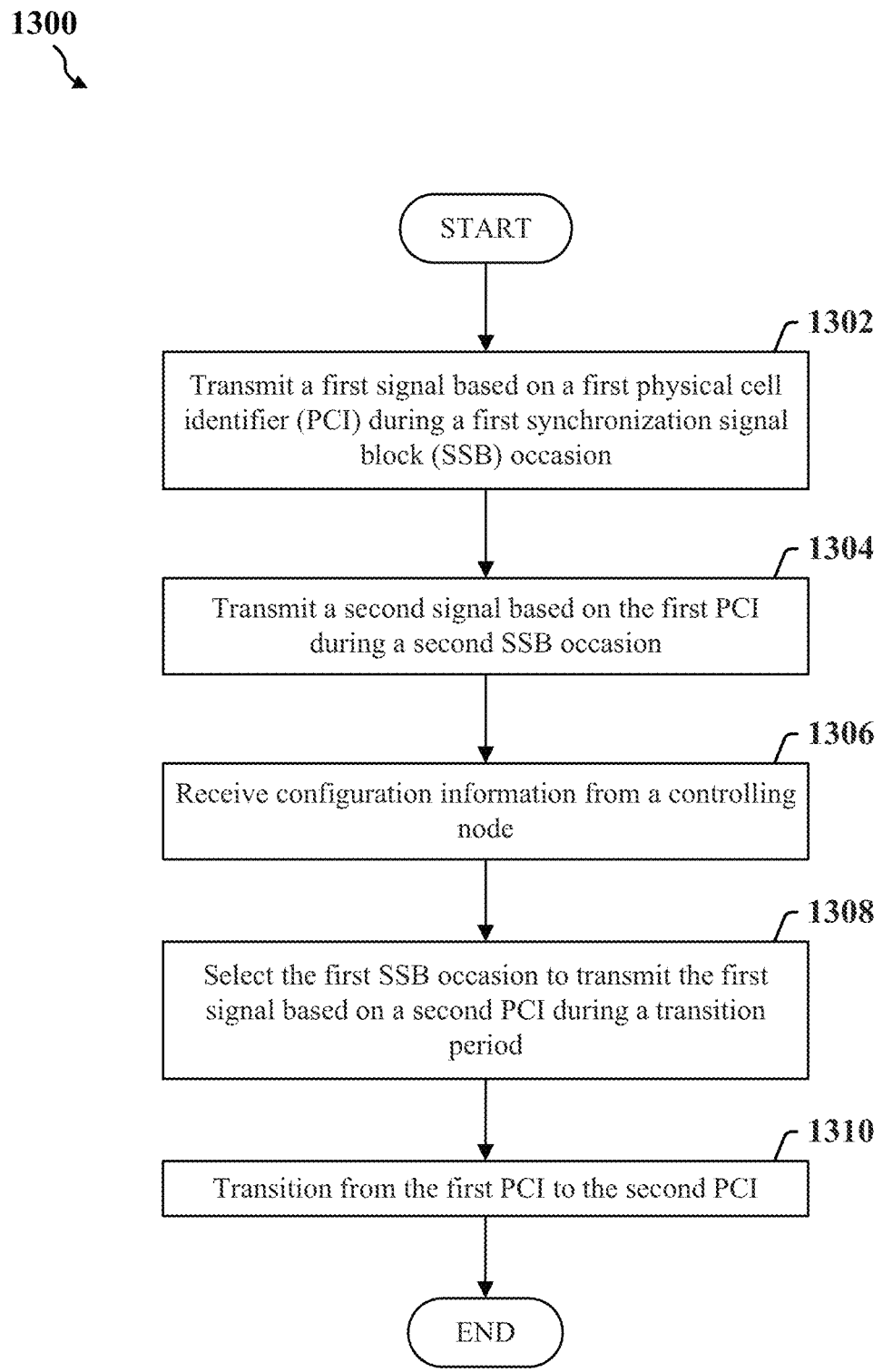
FIG. 13 is a flow chart illustrating an exemplary process for changing a physical cell identifier (PCI) at a network node in accordance with aspects of the present disclosure.

FIG. 13 is a flow chart illustrating an exemplary process 1300 for changing a physical cell identifier (PCI) at a network node in accordance with aspects of the present disclosure. As described below, some or all illustrated features may be omitted in a particular implementation within the scope of the present disclosure, and some illustrated features may not be required for implementation of all aspects. In some examples, the process 1300 may be carried out by the network node 1200 illustrated in FIG. 12, which may be a base station, gNB, gNB-DU, IAB-donor DU, or IAB-node DU, as illustrated in any one or more of FIGS. 1, 3-6, 8, and/or 9. In some examples, the process 1300 may be carried out by any suitable apparatus or means for carrying out the functions or algorithm described below.

At block 1302, the network node transmits a first signal based on a first physical cell identifier (PCI) during a first synchronization signal block (SSB) occasion. At block 1304, the network node transmits a second signal based on the first PCI during a second SSB occasion. The first SSB occasion and the second SSB occasion may be part of a set of SSB occasions in a periodically repeating time frame (e.g., half-frame).

At block 1306, the network node receives configuration information from a controlling node (e.g., gNB-CU). The configuration information may include an index of the first SSB occasion, or an indication of an SSB area associated with the first SSB occasion or a first beam transmitted during the first SSB occasion. The configuration information may include a threshold of a number of served child nodes, wherein a number of child nodes served by the first beam is less than or equal to the threshold (child node threshold may be zero). The configuration information may also include a threshold of a total throughput delivered to served child nodes, wherein a total throughput delivered to child nodes served by the first beam is less than the threshold (throughput threshold may be directional). The configuration information may include a condition associated with a QoS requirement, wherein a service provided to child nodes served on the first beam satisfies the condition (e.g., QoS requirement: RLC CH QoS class). The configuration information may also include channel quality information, wherein the network node serves a child node on the first beam with a lower link quality than that carried by the configuration information. The network node may also receive from the controlling node second configuration information associated with a second network node.

At block 1308, the network node selects the first SSB occasion to transmit the first signal based on a second PCI during a transition period. Selection may be based on the received configuration information. Moreover, selection may be based on (triggered by) one or more conditions. Conditions may include the network node serving no child nodes on the first beam and serving one or more child nodes on the second beam, the network node serving one or more child nodes on the first beam that is less than two or more child nodes served on the second beam, the network node delivering a total throughput to child nodes served on the first beam that is less than a total throughput delivered to child nodes served on the second beam (throughput may be directional), the network node providing a service to child nodes served on the first beam that has a lower quality of service (QoS) requirement than a service provided to child nodes served on the second beam, the network node serving a child node on the first beam with a lower link quality than a link quality of a child node served on the second beam, communication between the network node and a child node served on the first beam incurring more interference than communication between the network node and a child served on the second beam, and/or communication between the network node and a child node served on the first beam causing more interference to communication of another cell served by a second network node than communication between the network node and a child node served on the second beam. In aspect, the network node performs the selection such that no System Information Block Type 1 (SIB1) update associated with the first PCI is incurred (e.g., compressed bitmap in SIB1 is not impacted).

At block 1310, the network node transitions from the first PCI to a second PCI. During a transition period, the network node transmits the first signal based on the second PCI during the first SSB occasion, and continues to transmit the second signal based on the first PCI during the second SSB occasion. After an end of the transition period, the network node continues to transmit the first signal based on the second PCI during the first SSB occasion, and ceases transmission of the second signal based on the first PCI during the second SSB occasion. The network node may also transmit the second signal based on the second PCI during the second SSB occasion after the end of the transition period. In an aspect, the network node may transmit a third signal based on the second PCI during a third SSB occasion of the set of SSB occasions (where the first PCI is not initially transmitted before the transition period) during and/or after the end of the transition period.

In an aspect, the network node transitions by transmitting the first signal based on the first PCI during the first SSB occasion via a first beam, and transmitting the second signal based on the first PCI during the second SSB occasion via a second beam. The first beam and the second beam may be transmitted in a same direction.

In an aspect, the network node transitions by receiving from a controlling node (e.g., gNB-CU) an indication to transition from the first PCI to the second PCI, and determining to transition from the first PCI to the second PCI based on the indication. In a further aspect, the network node transitions by indicating to the controlling node a start of the transition from the first PCI to the second PCI.

In an aspect, the network node transitions by detecting a signal transmitted by a different network node based on the first PCI, and determining to transition from the first PCI to the second PCI based on the detection.

In an aspect, the network node is a distributed unit (DU) of an integrated access and backhaul (IAB)-node, and the network node is triggered to transition by a handover command/cell group change for a collocated mobile termination (MT) unit of the IAB-node.

In an aspect, the network node performs the transition while a child node (e.g., UE or IAB-node MT) migrates from the first PCI to the second PCI. Here, the child node is served on a second beam and the network node transmits the first signal based on the second PCI during the first SSB occasion using a beam that is quasi-collocated with the second beam. Alternatively, the child node is served on a first beam and the network node transmits the first signal based on the second PCI during the first SSB occasion using a beam that is quasi-collocated with the first beam.

In an aspect, the network node transitions by performing a System Information Block Type 1 (SIB1) update during the transition period. The SIB1 update may include at least one of updating a bitmap of indices of the SSB occasions in which a signal based on the first PCI is transmitted, updating a quasi-collocated (QCL) relationship among beams associated with the SSB occasions in which a signal based on the first PCI is transmitted, sending an updated SIB1 message to a controlling node (e.g., gNB-CU), or updating a SIB1 transmission.

In an aspect, the network node transitions by sending a System Information Block Type 1 (SIB1) message corresponding to a signal transmitted based on the second PCI during the transition period, and sending an updated SIB1 message after the end of the transition period.

In an aspect, the network node (e.g., gNB-CU) transitions by sending an updated System Information Block Type 1 (SIB1) message corresponding to a signal transmitted based on the first PCI or the second PCI during the transition period. The updated SIB1 message is sent in a dedicated manner to a connected or idle child node.

In an aspect, the network node transitions by refraining from sending an updated System Information Block Type 1 (SIB1) message corresponding to a signal transmitted based on the first PCI or the second PCI during the transition period, and sending a new SIB1 message corresponding to a signal transmitted based on the second PCI after the end of the transition period.

In an aspect, the network node transitions by sending a short message to a child node or sending a paging message to an idle user equipment (UE) to indicate an update of system information.

In an aspect, based on the configuration information (which may be conditional, e.g., depending on length of the transition period), the network node transitions by performing a System Information Block Type 1 (SIB1) update during the transition period, sending a short message to a child node to indicate an update of system information during the transition period, or sending a paging message to an idle user equipment (UE) to indicate an update of system information during the transition period.

In one configuration, the network node 1200 for wireless communication includes means for transmitting a first signal (e.g., first PCI transmitting circuitry 1240, transceiver 1210, and/or antenna array 1230) based on a first physical cell identifier (PCI) during a first synchronization signal block (SSB) occasion, means for transmitting a second signal (e.g., first PCI transmitting circuitry 1240, transceiver 1210, and/or antenna array 1230) based on the first PCI during a second SSB occasion, wherein the first SSB occasion and the second SSB occasion are part of a set of SSB occasions in a periodically repeating time frame, means for transitioning from the first PCI to a second PCI (e.g., PCI transitioning circuitry 1244, transceiver 1210, and/or antenna array 1230), wherein during a transition period, the means for transitioning is configured to transmit the first signal based on the second PCI during the first SSB occasion (e.g., via the second PCI transmitting circuitry 1246), and continue to transmit the second signal based on the first PCI during the second SSB occasion (e.g., via the first PCI transmitting circuitry 1240, and wherein after an end of the transition period, the means for transitioning is configured to continue to transmit the first signal based on the second PCI during the first SSB occasion (e.g., via the second PCI transmitting circuitry 1246), and cease transmission of the second signal based on the first PCI during the second SSB occasion, means for receiving configuration information (e.g., configuration information receiving circuitry 1242), transceiver 1210, and/or antenna array 1230) from a controlling node, and means for selecting (e.g., PCI transitioning circuitry 1244), based on the configuration information, the first SSB occasion to transmit the first signal based on the second PCI during the transition period. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3-6, 8, and/or 9 and utilizing, for example, the processes and/or algorithms described herein in relation to FIG. 13.

Figure 14:
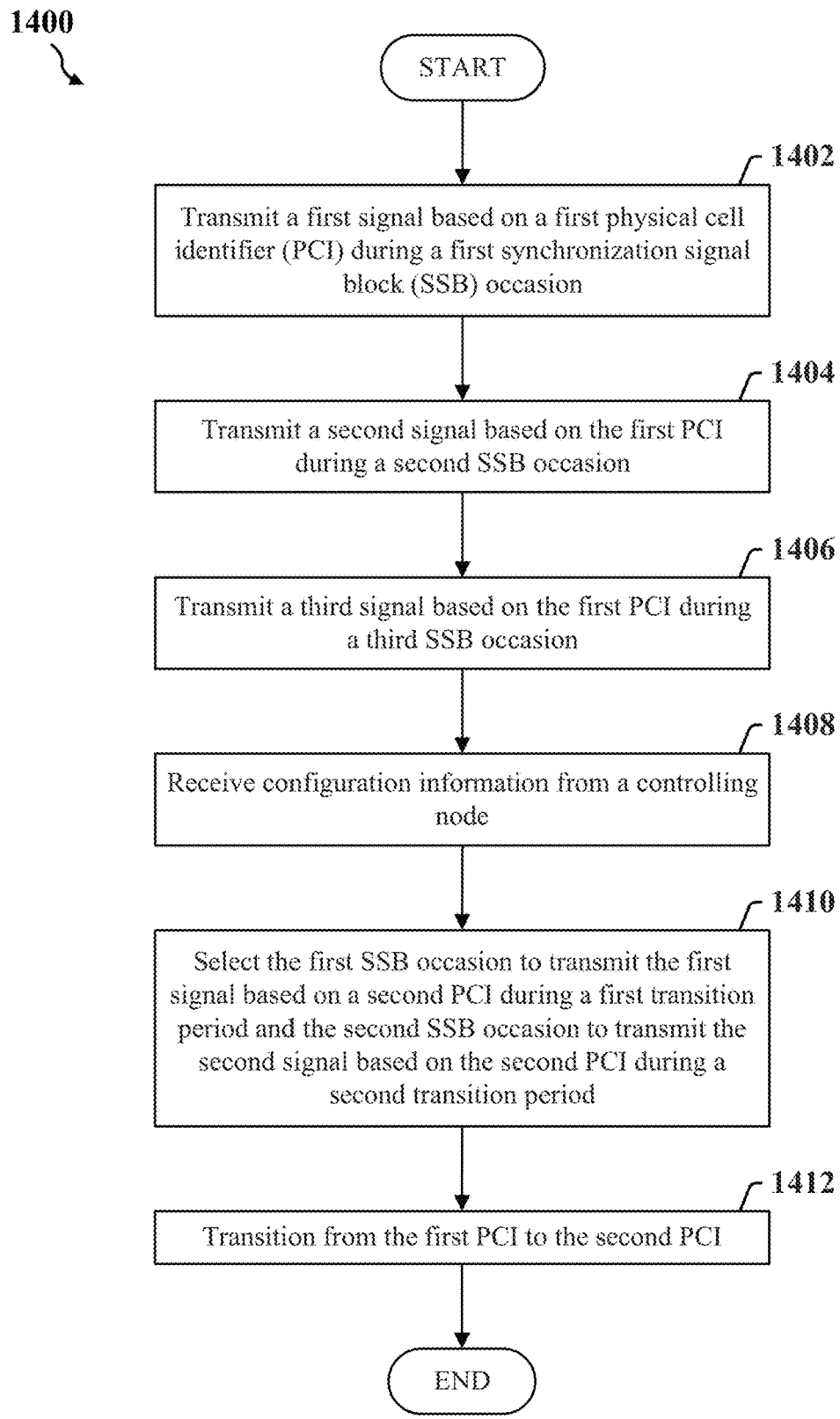
FIG. 14 is a flow chart illustrating an exemplary process for changing a physical cell identifier (PCI) at a network node in accordance with other aspects of the present disclosure.

FIG. 14 is a flow chart illustrating an exemplary process 1400 for changing a physical cell identifier (PCI) at a network node in accordance with aspects of the present disclosure. As described below, some or all illustrated features may be omitted in a particular implementation within the scope of the present disclosure, and some illustrated features may not be required for implementation of all aspects. In some examples, the process 1400 may be carried out by the network node 1200 illustrated in FIG. 12, which may be a base station, gNB, gNB-DU, IAB-donor DU, or IAB-node DU, as illustrated in any one or more of FIGS. 1, 3-6, 8, and/or 9. In some examples, the process 1400 may be carried out by any suitable apparatus or means for carrying out the functions or algorithm described below.

At block 1402, the network node transmits a first signal based on a first physical cell identifier (PCI) during a first synchronization signal block (SSB) occasion. At block 1404, the network node transmits a second signal based on the first PCI during a second SSB occasion. At block 1403, the network node transmits a third signal based on the first PCI during a third SSB occasion. The first, second, and third SSB occasions may be part of a set of SSB occasions in a periodically repeating time frame (e.g., half-frame).

At block 1408, the network node receives configuration information from a controlling node (e.g., gNB-CU). At block 1410, the network selects the first SSB occasion to transmit the first signal based on a second PCI during a first transition period and the second SSB occasion to transmit the second signal based on the second PCI during a second transition period. Selection may be based on the configuration information received from the controlling node. The configuration may include an index of the first SSB occasion and an index of the second SSB occasion. Moreover, selection may be based on one or more conditions. Conditions may include the network node switching a PCI during the first SSB occasion where no child nodes are served on a first beam associated with the first SSB occasion, child nodes served on a second beam associated with the second SSB occasion migrating to the second PCI, wherein the child nodes are served on a beam that is quasi-collocated with the second beam and is transmitted during the first SSB occasion, or no child nodes are served on the second beam associated with the second SSB occasion, and therefore, the network node switches PCI during the second SSB occasion.

At block 1412, the network node transitions from the first PCI to the second PCI. During a first transition period, the network node transmits the first signal based on the second PCI during the first SSB occasion, continues to transmit the second signal based on the first PCI during the second SSB occasion, and continues to transmit the third signal based on the first PCI during the third SSB occasion. During a second transition period, the network node continues to transmit the first signal based on the second PCI during the first SSB occasion, transmits the second signal based on the second PCI during the second SSB occasion, and continues to transmit the third signal based on the first PCI during the third SSB occasion. After an end of the second transition period, the network node continues to transmit the first signal based on the second PCI during the first SSB occasion, continues to transmit the second signal based on the second PCI during the second SSB occasion, and ceases transmission of the third signal based on the first PCI during the third SSB occasion. The network node may also transmit the third signal based on the second PCI during the third SSB occasion after the end of the second transition period.

In one configuration, the network node 1200 for wireless communication includes means for transmitting a first signal (e.g., first PCI transmitting circuitry 1240, transceiver 1210, and/or antenna array 1230) based on a first physical cell identifier (PCI) during a second synchronization signal block (SSB) occasion, means for transmitting a second signal (e.g., first PCI transmitting circuitry 1240, transceiver 1210, and/or antenna array 1230) based on the first PCI during a second SSB occasion, means for transmitting a third signal (e.g., first PCI transmitting circuitry 1240, transceiver 1210, and/or antenna array 1230) based on the first PCI during a third SSB occasion, wherein the first, second, and third SSB occasions are part of a set of SSB occasions in a periodically repeating time frame, means for transitioning (e.g., PCI transitioning circuitry 1244, transceiver 1210, and/or antenna array 1230) from the first PCI to a second PCI, wherein during a first transition period, the means for transitioning is configured to transmit the first signal based on the second PCI during the first SSB occasion (e.g., via the second PCI transmitting circuitry 1246), continue to transmit the second signal based on the first PCI during the second SSB occasion (e.g., via the first PCI transmitting circuitry 1240), and continue to transmit the third signal based on the first PCI during the third SSB occasion (e.g., via the first PCI transmitting circuitry 1240), wherein during a second transition period, the means for transitioning is configured to continue to transmit the first signal based on the second PCI during the first SSB occasion (e.g., via the second PCI transmitting circuitry 1246), transmit the second signal based on the second PCI during the second SSB occasion (e.g., via the second PCI transmitting circuitry 1246), and continue to transmit the third signal based on the first PCI during the third SSB occasion (e.g., via the first PCI transmitting circuitry 1240), and wherein after an end of the second transition period, the means for transitioning is configured to continue to transmit the first signal based on the second PCI during the first SSB occasion (e.g., via the second PCI transmitting circuitry 1246), continue to transmit the second signal based on the second PCI during the second SSB occasion (e.g., via the second PCI transmitting circuitry 1246), and cease transmission of the third signal based on the first PCI during the third SSB occasion, means for receiving configuration information (e.g., configuration information receiving circuitry 1242, transceiver 1210, and/or antenna array 1230) from a controlling node, and means for selecting (e.g., PCI transitioning circuitry 1244) the first SSB occasion to transmit the first signal based on the second PCI during the first transition period and the second SSB occasion to transmit the second signal based on the second PCI during the second transition period. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3-6, 8, and/or 9 and utilizing, for example, the processes and/or algorithms described herein in relation to FIG. 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method performed at a network node for changing a physical cell identifier (PCI), comprising: transmitting a first signal based on a first physical cell identifier (PCI) during a first synchronization signal block (SSB) occasion; transmitting a second signal based on the first PCI during a second SSB occasion, wherein the first SSB occasion and the second SSB occasion are part of a set of SSB occasions in a periodically repeating time frame; and transitioning from the first PCI to a second PCI, wherein during a transition period, the transitioning comprises: transmitting the first signal based on the second PCI during the first SSB occasion, and continuing to transmit the second signal based on the first PCI during the second SSB occasion, and wherein after an end of the transition period, the transitioning comprises: continuing to transmit the first signal based on the second PCI during the first SSB occasion, and ceasing transmission of the second signal based on the first PCI during the second SSB occasion.

Aspect 2: The method of aspect 1, wherein the transitioning further comprises: transmitting the second signal based on the second PCI during the second SSB occasion after the end of the transition period.

Aspect 3: The method of aspect 1 or 2, wherein the transitioning further comprises: transmitting a third signal based on the second PCI during a third SSB occasion of the set of SSB occasions during and/or after the end of the transition period.

Aspect 4: The method of any one of aspects 1 through 3, wherein the transitioning further comprises: transmitting the first signal based on the first PCI during the first SSB occasion via a first beam; and transmitting the second signal based on the first PCI during the second SSB occasion via a second beam.

Aspect 5: The method of any one of aspects 1 through 4, wherein the transitioning further comprises transmitting the first beam and the second beam in a same direction.

Aspect 6: The method of any one of aspects 1 through 5, wherein the transitioning further comprises selecting the first SSB occasion to transmit the first signal based on the second PCI during the transition period, wherein the selecting is based on: the network node serving no child nodes on the first beam and serving one or more child nodes on the second beam; the network node serving one or more child nodes on the first beam that is less than two or more child nodes served on the second beam; the network node delivering a total throughput to child nodes served on the first beam that is less than a total throughput delivered to child nodes served on the second beam; the network node providing a service to child nodes served on the first beam that has a lower quality of service (QoS) requirement than a service provided to child nodes served on the second beam; the network node serving a child node on the first beam with a lower link quality than a link quality of a child node served on the second beam; communication between the network node and a child node served on the first beam incurring more interference than communication between the network node and a child served on the second beam; or communication between the network node and a child node served on the first beam causing more interference to communication of another cell served by a second network node than communication between the network node and a child node served on the second beam.

Aspect 7: The method of any one of aspects 1 through 6, wherein the selecting the first SSB occasion to transmit the first signal based on the second PCI during the transition period comprises selecting such that no System Information Block Type 1 (SIB1) update associated with the first PCI is incurred.

Aspect 8: The method of any one of aspects 1 through 7, further comprising receiving configuration information from a controlling node, wherein the selecting of the first SSB occasion to transmit the first signal based on the second PCI during the transition period is based on the configuration information, the configuration information comprising at least one of: an index of the first SSB occasion; an indication of an SSB area associated with the first SSB occasion or the first beam transmitted during the first SSB occasion; a threshold of a number of served child nodes, wherein a number of child nodes served by the first beam is less than or equal to the threshold; a threshold of a total throughput delivered to served child nodes, wherein a total throughput delivered to child nodes served by the first beam is less than the threshold; a condition associated with a QoS requirement, wherein a service provided to child nodes served on the first beam satisfies the condition; or channel quality information.

Aspect 9: The method of any one of aspects 1 through 8, further comprising receiving from the controlling node second configuration information associated with a second network node.

Aspect 10: The method of any one of aspects 1 through 9, wherein the transitioning further comprises: receiving from a controlling node an indication to transition from the first PCI to the second PCI; and determining to transition from the first PCI to the second PCI based on the indication.

Aspect 11: The method of any one of aspects 1 through 10, wherein the transitioning further comprises indicating to the controlling node a start of the transition from the first PCI to the second PCI.

Aspect 12: The method of any one of aspects 1 through 11, wherein the transitioning further comprises: detecting a signal transmitted by a different network node based on the first PCI; and determining to transition from the first PCI to the second PCI based on the detection.

Aspect 13: The method of any one of aspects 1 through 12, wherein: the network node is a distributed unit (DU) of an integrated access and backhaul (IAB)-node; and the transitioning is triggered by a handover command/cell group change for a collocated mobile termination (MT) unit of the IAB-node.

Aspect 14: The method of any one of aspects 1 through 13, wherein the transitioning is performed while a child node migrates from the first PCI to the second PCI, wherein: the child node is served on a second beam and the network node transmits the first signal based on the second PCI during the first SSB occasion using a beam that is quasi-collocated with the second beam; or the child node is served on a first beam and the network node transmits the first signal based on the second PCI during the first SSB occasion using a beam that is quasi-collocated with the first beam.

Aspect 15: The method of any one of aspects 1 through 14, wherein the network node is: a gNodeB; a gNodeB-distributed unit (gNB-DU); an integrated access and backhaul (IAB)-donor distributed unit (IAB-donor DU); or an integrated access and backhaul (IAB)-node distributed unit (IAB-node DU).

Aspect 16: The method of any one of aspects 1 through 15, wherein the transitioning further comprises performing a System Information Block Type 1 (SIB1) update during the transition period, the SIB1 update comprising at least one of: updating a bitmap of indices of the SSB occasions in which a signal based on the first PCI is transmitted; updating a quasi-collocated (QCL) relationship among beams associated with the SSB occasions in which a signal based on the first PCI is transmitted; sending an updated SIB1 message to a controlling node; or updating a SIB1 transmission.

Aspect 17: The method of any one of aspects 1 through 16, wherein the transitioning further comprises: sending a System Information Block Type 1 (SIB1) message corresponding to a signal transmitted based on the second PCI during the transition period; and sending an updated SIB1 message after the end of the transition period.

Aspect 18: The method of any one of aspects 1 through 17, wherein the transitioning further comprises sending an updated System Information Block Type 1 (SIB1) message corresponding to a signal transmitted based on the first PCI or the second PCI during the transition period, wherein the updated SIB1 message is sent in a dedicated manner to a connected or idle child node.

Aspect 19: The method of any one of aspects 1 through 18, wherein the transitioning further comprises: refraining from sending an updated System Information Block Type 1 (SIB1) message corresponding to a signal transmitted based on the first PCI or the second PCI during the transition period; and sending a new SIB1 message corresponding to a signal transmitted based on the second PCI after the end of the transition period.

Aspect 20: The method of any one of aspects 1 through 19, wherein the transitioning further comprises sending a short message to a child node or sending a paging message to an idle user equipment (UE) to indicate an update of system information.

Aspect 21: The method of any one of aspects 1 through 20, further comprising: receiving configuration information from a controlling node; and based on the configuration information: performing a System Information Block Type 1 (SIB1) update during the transition period, sending a short message to a child node to indicate an update of system information during the transition period, or sending a paging message to an idle user equipment (UE) to indicate an update of system information during the transition period.

Aspect 22: A method performed at a network node for changing a physical cell identifier (PCI), comprising: transmitting a first signal based on a first physical cell identifier (PCI) during a first synchronization signal block (SSB) occasion; transmitting a second signal based on the first PCI during a second SSB occasion; transmitting a third signal based on the first PCI during a third SSB occasion, wherein the first, second, and third SSB occasions are part of a set of SSB occasions in a periodically repeating time frame; and transitioning from the first PCI to a second PCI, wherein during a first transition period, the transitioning comprises:

transmitting the first signal based on the second PCI during the first SSB occasion, continuing to transmit the second signal based on the first PCI during the second SSB occasion, and continuing to transmit the third signal based on the first PCI during the third SSB occasion, wherein during a second transition period, the transitioning comprises: continuing to transmit the first signal based on the second PCI during the first SSB occasion, transmitting the second signal based on the second PCI during the second SSB occasion, and continuing to transmit the third signal based on the first PCI during the third SSB occasion, and wherein after an end of the second transition period, the transitioning comprises: continuing to transmit the first signal based on the second PCI during the first SSB occasion, continuing to transmit the second signal based on the second PCI during the second SSB occasion, and ceasing transmission of the third signal based on the first PCI during the third SSB occasion.

Aspect 23: The method of aspect 22, wherein the transitioning further comprises: transmitting the third signal based on the second PCI during the third SSB occasion after the end of the second transition period.

Aspect 24: The method of aspect 22 or 23, further comprising selecting the first SSB occasion to transmit the first signal based on the second PCI during the first transition period and the second SSB occasion to transmit the second signal based on the second PCI during the second transition period, wherein the selecting is based on at least one of: a configuration received from a controlling node providing an index of the first SSB occasion and an index of the second SSB occasion; the network node switching a PCI during the first SSB occasion where no child nodes are served on a first beam associated with the first SSB occasion; child nodes served on a second beam associated with the second SSB occasion migrating to the second PCI, wherein the child nodes are served on a beam that is quasi-collocated with the second beam and is transmitted during the first SSB occasion; or no child nodes are served on the second beam associated with the second SSB occasion.

Aspect 25: A network node for changing a physical cell identifier (PCI) comprising a processor, and memory coupled with the processor, the processor and memory configured to perform a method of any one of aspects 1 through 21 or aspects 22 through 24.

Aspect 26: A network node for changing a physical cell identifier (PCI) comprising at least one means for performing a method of any one of aspects 1 through 21 or aspects 22 through 24.

Aspect 27: A non-transitory computer-readable medium storing code for changing a physical cell identifier (PCI) at a network node, the code comprising instructions executable by a processor to perform a method of any one of aspects 1 through 21 or aspects 22 through 24.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method performed at a network node for changing a physical cell identifier (PCI), comprising:
    transmitting a first signal based on a first physical cell identifier (PCI) during a first synchronization signal block (SSB) occasion;
    transmitting a second signal based on the first PCI during a second SSB occasion, wherein the first SSB occasion and the second SSB occasion are part of a set of SSB occasions in a periodically repeating time frame; and
    transitioning from the first PCI to a second PCI,
    wherein during a transition period, the transitioning comprises:
        transmitting the first signal based on the second PCI during the first SSB occasion, and continuing to transmit the second signal based on the first PCI during the second SSB occasion, and
    wherein after an end of the transition period, the transitioning comprises:
        continuing to transmit the first signal based on the second PCI during the first SSB occasion, and ceasing transmission of the second signal based on the first PCI during the second SSB occasion.

2. The method of claim 1, wherein the transitioning further comprises:
    transmitting the second signal based on the second PCI during the second SSB occasion after the end of the transition period.

3. The method of claim 1, wherein the transitioning further comprises:
    transmitting a third signal based on the second PCI during a third SSB occasion of the set of SSB occasions during and/or after the end of the transition period.

4. The method of claim 1, wherein the transitioning further comprises:
    transmitting the first signal based on the first PCI during the first SSB occasion via a first beam; and
    transmitting the second signal based on the first PCI during the second SSB occasion via a second beam.

5. The method of claim 4, wherein the transitioning further comprises transmitting the first beam and the second beam in a same direction.

6. The method of claim 4, wherein the transitioning further comprises selecting the first SSB occasion to transmit the first signal based on the second PCI during the transition period, wherein the selecting is based on:
    the network node serving no child nodes on the first beam and serving one or more child nodes on the second beam;
    the network node serving one or more child nodes on the first beam that is less than two or more child nodes served on the second beam;

the network node delivering a total throughput to child nodes served on the first beam that is less than a total throughput delivered to child nodes served on the second beam;

the network node providing a service to child nodes served on the first beam that has a lower quality of service (QoS) requirement than a service provided to child nodes served on the second beam;

the network node serving a child node on the first beam with a lower link quality than a link quality of a child node served on the second beam;

communication between the network node and a child node served on the first beam incurring more interference than communication between the network node and a child served on the second beam; or communication between the network node and a child node served on the first beam causing more interference to communication of another cell served by a second network node than communication between the network node and a child node served on the second beam.

7. The method of claim 6, wherein the selecting the first SSB occasion to transmit the first signal based on the second PCI during the transition period comprises selecting such that no System Information Block Type 1 (SIB1) update associated with the first PCI is incurred.

8. The method of claim 6, further comprising receiving configuration information from a controlling node, wherein the selecting of the first SSB occasion to transmit the first signal based on the second PCI during the transition period is based on the configuration information, the configuration information comprising at least one of:

an index of the first SSB occasion;

an indication of an SSB area associated with the first SSB occasion or the first beam transmitted during the first SSB occasion;

a threshold of a number of served child nodes, wherein a number of child nodes served by the first beam is less than or equal to the threshold;

a threshold of a total throughput delivered to served child nodes, wherein a total throughput delivered to child nodes served by the first beam is less than the threshold;

a condition associated with a QoS requirement, wherein a service provided to child nodes served on the first beam satisfies the condition; or channel quality information.

9. The method of claim 8, further comprising receiving from the controlling node second configuration information associated with a second network node.

10. The method of claim 1, wherein the transitioning further comprises:

receiving from a controlling node an indication to transition from the first PCI to the second PCI; and determining to transition from the first PCI to the second PCI based on the indication.

11. The method of claim 10, wherein the transitioning further comprises indicating to the controlling node a start of the transition from the first PCI to the second PCI.

12. The method of claim 1, wherein the transitioning further comprises:

detecting a signal transmitted by a different network node based on the first PCI; and determining to transition from the first PCI to the second PCI based on the detection.

13. The method of claim 1, wherein:

the network node is a distributed unit (DU) of an integrated access and backhaul (IAB)-node; and the transitioning is triggered by a handover command/cell group change for a collocated mobile termination (MT) unit of the IAB-node.

14. The method of claim 1, wherein the transitioning is performed while a child node migrates from the first PCI to the second PCI, wherein:

the child node is served on a second beam and the network node transmits the first signal based on the second PCI during the first SSB occasion using a beam that is quasi-collocated with the second beam; or the child node is served on a first beam and the network node transmits the first signal based on the second PCI during the first SSB occasion using a beam that is quasi-collocated with the first beam.

15. The method of claim 1, wherein the network node is:

a gNodeB;

a gNodeB-distributed unit (gNB-DU);

an integrated access and backhaul (IAB)-donor distributed unit (IAB-donor DU); or an integrated access and backhaul (IAB)-node distributed unit (IAB-node DU).

16. The method of claim 1, wherein the transitioning further comprises performing a System Information Block Type 1 (SIB1) update during the transition period, the SIB1 update comprising at least one of:

updating a bitmap of indices of the SSB occasions in which a signal based on the first PCI is transmitted;

updating a quasi-collocated (QCL) relationship among beams associated with the SSB occasions in which a signal based on the first PCI is transmitted;

sending an updated SIB1 message to a controlling node; or updating a SIB1 transmission.

17. The method of claim 1, wherein the transitioning further comprises:

sending a System Information Block Type 1 (SIB1) message corresponding to a signal transmitted based on the second PCI during the transition period; and sending an updated SIB1 message after the end of the transition period.

18. The method of claim 1, wherein the transitioning further comprises sending an updated System Information Block Type 1 (SIB1) message corresponding to a signal transmitted based on the first PCI or the second PCI during the transition period, wherein the updated SIB1 message is sent in a dedicated manner to a connected or idle child node.

19. The method of claim 1, wherein the transitioning further comprises:

refraining from sending an updated System Information Block Type 1 (SIB1) message corresponding to a signal transmitted based on the first PCI or the second PCI during the transition period; and sending a new SIB1 message corresponding to a signal transmitted based on the second PCI after the end of the transition period.

20. The method of claim 1, wherein the transitioning further comprises sending a short message to a child node or sending a paging message to an idle user equipment (UE) to indicate an update of system information.

21. The method of claim 1, further comprising:

receiving configuration information from a controlling node; and based on the configuration information:

performing a System Information Block Type 1 (SIB1) update during the transition period, sending a short message to a child node to indicate an update of system information during the transition period, or sending a paging message to an idle user equipment (UE) to indicate an update of system information during the transition period.

22. A method performed at a network node for changing a physical cell identifier (PCI), comprising:

transmitting a first signal based on a first physical cell identifier (PCI) during a first synchronization signal block (SSB) occasion;

transmitting a second signal based on the first PCI during a second SSB occasion;

transmitting a third signal based on the first PCI during a third SSB occasion, wherein the first, second, and third SSB occasions are part of a set of SSB occasions in a periodically repeating time frame; and transitioning from the first PCI to a second PCI, wherein during a first transition period, the transitioning comprises:

transmitting the first signal based on the second PCI during the first SSB occasion, continuing to transmit the second signal based on the first PCI during the second SSB occasion, and continuing to transmit the third signal based on the first PCI during the third SSB occasion, wherein during a second transition period, the transitioning comprises:

continuing to transmit the first signal based on the second PCI during the first SSB occasion, transmitting the second signal based on the second PCI during the second SSB occasion, and continuing to transmit the third signal based on the first PCI during the third SSB occasion, and wherein after an end of the second transition period, the transitioning comprises:

continuing to transmit the first signal based on the second PCI during the first SSB occasion, continuing to transmit the second signal based on the second PCI during the second SSB occasion, and ceasing transmission of the third signal based on the first PCI during the third SSB occasion.

23. The method of claim 22, wherein the transitioning further comprises:

transmitting the third signal based on the second PCI during the third SSB occasion after the end of the second transition period.

24. The method of claim 22, further comprising selecting the first SSB occasion to transmit the first signal based on the second PCI during the first transition period and the second SSB occasion to transmit the second signal based on the second PCI during the second transition period, wherein the selecting is based on at least one of:

a configuration received from a controlling node providing an index of the first SSB occasion and an index of the second SSB occasion;

the network node switching a PCI during the first SSB occasion where no child nodes are served on a first beam associated with the first SSB occasion;

child nodes served on a second beam associated with the second SSB occasion migrating to the second PCI, wherein the child nodes are served on a beam that is quasi-collocated with the second beam and is transmitted during the first SSB occasion; or no child nodes are served on the second beam associated with the second SSB occasion.

25. A network node for changing a physical cell identifier (PCI), comprising:

at least one processor; and a memory coupled to the at least one processor, the at least one processor and the memory configured to:

transmit a first signal based on a first physical cell identifier (PCI) during a first synchronization signal block (SSB) occasion;

transmit a second signal based on the first PCI during a second SSB occasion, wherein the first SSB occasion and the second SSB occasion are part of a set of SSB occasions in a periodically repeating time frame; and transition from the first PCI to a second PCI, wherein during a transition period, the at least one processor and the memory configured to transition are configured to:

transmit the first signal based on the second PCI during the first SSB occasion, and continue to transmit the second signal based on the first PCI during the second SSB occasion, and wherein after an end of the transition period, the at least one processor and the memory configured to transition are configured to:

continue to transmit the first signal based on the second PCI during the first SSB occasion, and cease transmission of the second signal based on the first PCI during the second SSB occasion.

26. The network node of claim 25, further comprising:

a transceiver, wherein the at least one processor and the memory are configured to transition are further configured to:

transmit the second signal based on the second PCI during the second SSB occasion after the end of the transition period.

27. The network node of claim 25, wherein the at least one processor and the memory configured to transition are further configured to:

transmit a third signal based on the second PCI during a third SSB occasion of the set of SSB occasions during and/or after the end of the transition period.

28. A network node for changing a physical cell identifier (PCI), comprising:

at least one processor; and a memory coupled to the at least one processor, the at least one processor and the memory configured to:

transmit a first signal based on a first physical cell identifier (PCI) during a first synchronization signal block (SSB) occasion;

transmit a second signal based on the first PCI during a second SSB occasion;

transmit a third signal based on the first PCI during a third SSB occasion, wherein the first, second, and third SSB occasions are part of a set of SSB occasions in a periodically repeating time frame; and transition from the first PCI to a second PCI, wherein during a first transition period, the at least one processor and the memory configured to transition are configured to:

transmit the first signal based on the second PCI during the first SSB occasion, continue to transmit the second signal based on the first PCI during the second SSB occasion, and continue to transmit the third signal based on the first PCI during the third SSB occasion, wherein during a second transition period, the at least one processor and the memory configured to transition are configured to:

continue to transmit the first signal based on the second PCI during the first SSB occasion, transmit the second signal based on the second PCI during the second SSB occasion, and continue to transmit the third signal based on the first PCI during the third SSB occasion, and wherein after an end of the second transition period, the at least one processor and the memory configured to transition are configured to:

continue to transmit the first signal based on the second PCI during the first SSB occasion, continue to transmit the second signal based on the second PCI during the second SSB occasion, and cease transmission of the third signal based on the first PCI during the third SSB occasion.

29. The network node of claim 28, further comprising:

a transceiver, wherein the at least one processor and the memory are configured to transition are further configured to:

transmit the third signal based on the second PCI during the third SSB occasion after the end of the second transition period.

30. The network node of claim 28, wherein the at least one processor and the memory are further configured to select the first SSB occasion to transmit the first signal based on the second PCI during the first transition period and the second SSB occasion to transmit the second signal based on the second PCI during the second transition period, wherein selection is based on at least one of:

a configuration received from a controlling node providing an index of the first SSB occasion and an index of the second SSB occasion;

the network node switching a PCI during the first SSB occasion where no child nodes are served on a first beam associated with the first SSB occasion;

child nodes served on a second beam associated with the second SSB occasion migrating to the second PCI, wherein the child nodes are served on a beam that is quasi-collocated with the second beam and is transmitted during the first SSB occasion; or no child nodes are served on the second beam associated with the second SSB occasion.

* * * * *